United States Patent [19]

Branston

[11] 4,422,265
[45] Dec. 27, 1983

[54] MULTISTATION GRINDING MACHINE

[75] Inventor: Keith Branston, Windsor, Canada

[73] Assignee: Jacobi-Branston Inc., Windsor, Canada

[21] Appl. No.: 273,779

[22] Filed: Jun. 15, 1981

[51] Int. Cl.$^3$ .............................................. B23F 19/05
[52] U.S. Cl. ................................. 51/52 R; 51/240 T; 51/2 XA; 409/158; 409/198
[58] Field of Search ........... 51/52 R, 240 RT, 165.71, 51/281 R, 134, 2 XA; 409/198, 158; 408/34; 198/377, 378; 125/11 NT

[56] References Cited

U.S. PATENT DOCUMENTS

| | | | |
|---|---|---|---|
| 323,175 | 7/1885 | Marsh | 51/52 R |
| 3,665,648 | 5/1972 | Yamanaka | 51/134 |
| 4,103,668 | 8/1978 | Nishimura et al. | 51/165.71 |
| 4,118,900 | 10/1978 | Moritomo et al. | 51/281 R |
| 4,266,375 | 5/1981 | Nishimura et al. | 51/165.71 |
| 4,274,231 | 6/1981 | Verega | 51/165.71 |

*Primary Examiner*—E. R. Kazenske
*Assistant Examiner*—Willmon Fridie, Jr.
*Attorney, Agent, or Firm*—LeBlanc, Nolan, Shur & Nies

[57] ABSTRACT

A multi-station grinding machine has a worktable mounted on a machine bed to rotate about a principal axis. The worktable has a plurality of workpiece holding devices at equal angular intervals around the axis and uniformly spaced therefrom, each holding devices defining parallel to said principal axis a support axis for a workpiece to be held therein. A loading/unloading station and three work stations are positioned around the principal axes each work station including a grinding wheel. Table index device effects angular indexing of the table about said principal axis through a series of registered positions to bring the workpieces into precise register with the work stations in succession. Workpiece index device at each work station is selectively coupled to effect predetermined incremental indexing rotation of a workpiece to present preselected portions of the workpiece for engagement by the associated grinding wheel.

24 Claims, 23 Drawing Figures

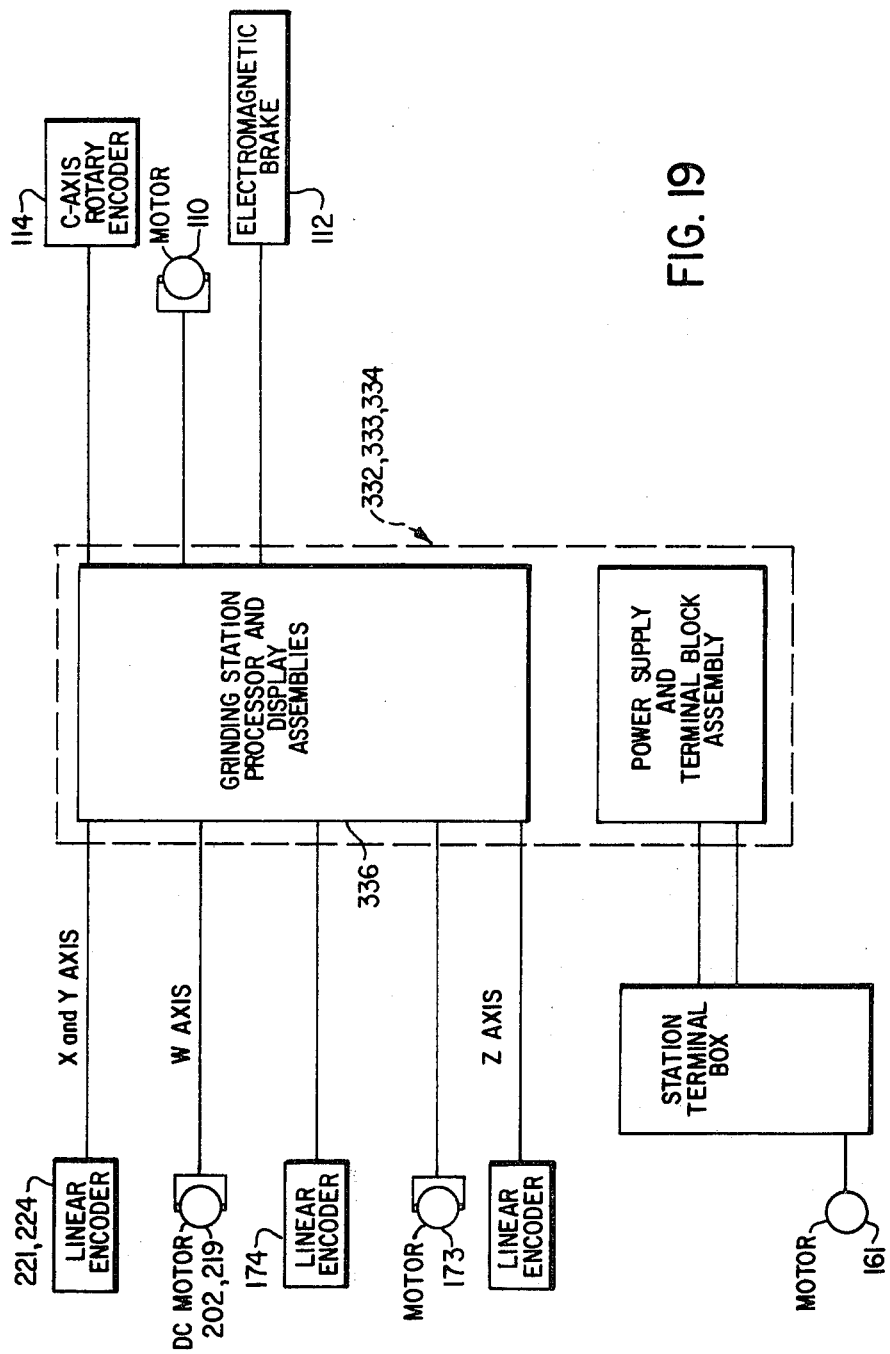

MULTISTATION GRINDING MACHINE

This invention relates to a new or improved metal working machine such as a grinder adapted to perform progressive operations on workpieces which are moved sequentially past a plurality of work stations. The grinding machine herein described is particularly adapted for the precision finish grinding of components such as gear wheels typically for applications in the aerospace industry.

DESCRIPTION OF THE PRIOR ART

Although multi-station metal removing machines for progressively machining components are well known in many applications, and in particular in multi-spindle lathes and the like, up to the present time there has not been available a multi-station grinding machine suitable for the progressive grinding of high-precision components such as gear wheels for aerospace applications.

In a conventional multi-station metal working machine, such as a multi-spindle lathe, the workpieces are mounted between centers or in chucks at fixed locations on a table, on axes parallel to the rotational axis of the table, and the table being rotated through angular increments, e.g. of 90°, to move the workpieces in succession into register with a series of work stations. In such applications, accurate indexing of the table through the appropriate angular interval is necessary to ensure correct registration of the workpieces with the metal working tools at those stations. However since the workpieces are almost always solids of revolution, there is no necessity to present the workpiece at the various stations in any particular angular orientation with respect to the axis upon which the workpiece is supported. However in a grinding machine for processing components such as gears, it is essential to index the workpiece with extreme accuracy angularly about a supporting axis, and with conventional gear grinding machines this has hitherto only been possible in a single spindle grinder. Accordingly there exists no gear grinding machine which can perform precision grinding of gear tooth forms in a progressive manner.

Typically, gear wheels are manufactured by machining a cylindrical blank to rough gear tooth form on a hobbing machine or the like, subsequently heat treating the rough finished blank to impart the required metallurgical properties, and grinding the rough finished blank to the required final form in a precision gear grinding machine. This grinding operation typically may involve the removal of no more than 0.005 to 0.007 inches of metal, but must be done with great accuracy to ensure that the final gear satisfies the exacting tolerances required as regards concentricity, tooth form, pitch circle diameter etc. Accordingly, such gear form grinding is carried out on a high precision gear grinding machine in which the workpiece is mounted between centers on an indexing head and successively indexed through angular increments corresponding to one tooth spacing and reciprocated past a tooth form grinding wheel. In such precision gear grinding machines three entire cycles of operation are necessary to achieve the final tooth form, namely "rough grinding", "intermediate grinding", and "finish grinding". However, as mentioned above, the total thickness of metal removed in all three cycles is extremely small, and may amount to no more than 0.007 inches.

It will be appreciated that the gear grinding operation referred to above is very slow, since each of the cycles involves indexing of the gear in successive increments to register each tooth with the grinding wheel, and after each index increment reciprocating the gear past the grinding wheel a number of times, each time effecting an incremental infeed of the grinding wheel until the desired amount of metal has been removed. Furthermore, frequent dressing of the grinding wheel is required to maintain the desired tooth form.

The object of the present invention is to provide a precision machine having a plurality of work stations which can operate simultaneously to effect progressive machine operations on such components with the precision necessary to produce finished workpieces which can meet the exacting dimensional tolerances required of gear wheels, particularly for use by the aerospace industry.

SUMMARY OF THE INVENTION

The invention provides a multi-station metal working machine comprising:

a machine bed;

a worktable mounted on said machine bed to rotate thereon about a principal axis, said worktable comprising a plurality of workpiece holding means mounted thereon at regular angular intervals around said axis and uniformly spaced therefrom, each holding means defining a support axis for a workpiece to be held therein;

a loading/unloading station and a plurality of work stations positioned around said bed, said stations being distributed about said principal axis at angular spacings corresponding to the angular intervals between said holding means, and each work station including machining means operative to effect material removal from a workpiece;

table index means operative between said table and said bed to effect angular indexing of said table about said principal axis through a series of registered positions in each of which one holding means has its support axis in precise register with said loading/unloading station and others of said holding means have their support axes in precise register with respective ones of said work stations, indexing of said table being effective to bring a workpiece successively into register with each of said work stations;

workpiece index means at each said work station engageable with a said holding means when the table is in a registered position to drive that holding means and effect predetermined incremental indexing rotation of a workpiece held therein to present preselected portions of the workpiece for engagement by the associated machining means.

Preferably the principal axis is vertically arranged and the support axes are parallel to it. In the preferred embodiment herein described a precision grinding machine has the workpiece index means located in fixed positions in the machine bed and adapted to be connected to the holding means intermittently through coupling means which can be selectively engaged when the table is in a registered position.

Conveniently the worktable has means for supporting four workpieces at 90° angular intervals about the principal axis and at a uniform radial spacing therefrom, the machine including in addition to the loading/unloading station, three work stations likewise spaced at 90° angular intervals. At each work station there is provided a support column which carries a grinding wheel mounted on an infeed mechanism, and a grinding feed mechanism. The column also supports a grinding wheel dressing mechanism, and includes means for automatic control of the movements of all such mechanisms.

The workpiece holding means may comprise a tail stock centrally mounted on the worktable and forming for each workpiece a support in the form of a center which is capable of precise adjustment to locate it on the desired axis. A second center, axially aligned with the tail stock center is supported in a precision bearing structure in the worktable and is engageable with a workpiece indexing mechanism at each of the work stations of the machine, there being included a brake means to maintain the desired angular orientation of the workpiece when it is not coupled to the indexing means, as when the table is being indexed to transfer a workpiece between work stations.

Conventional gear grinding machines require extremely expensive control elements, since it is necessary to provide an individual index plate for each gear to be ground, the index plate having the number of teeth appropriate to the number of teeth required in the workpiece being processed. Since the index plate itself is used to control the angular incremental, tooth-to-tooth indexing of the workpiece, it is evident that the index plates must be manufactured by the tool maker to an extremely high degree of precision, and accordingly are extremely expensive. Furthermore the accuracy of the system, and hence the accuracy of the finished workpiece, can only be as good as the accuracy of the index plate. Indeed where the gear is larger than the index plate, its accuracy must inevitably be somewhat less than that of the index plate.

The machine disclosed herein dispenses with the conventionally used index plates and their associated disadvantages as to extremely high cost, and limitations as to accuracy, and utilizes a numerical control system employing rotary and linear encoders to control the various functions of the machine as regards indexing of table and workpieces and control of the movements of the grinding wheel head and of the dressing mechanism.

DESCRIPTION OF THE DRAWINGS

The invention will further be described, by way of example only, with reference to the accompanying drawings which illustrate a preferred embodiment of the invention, and wherein:

FIG. 19 is a schematic diagram of the grinding station control system.

DESCRIPTION OF THE PREFERRED EMBODIMENT

GENERAL DESCRIPTION OF MACHINE

Figure 1:
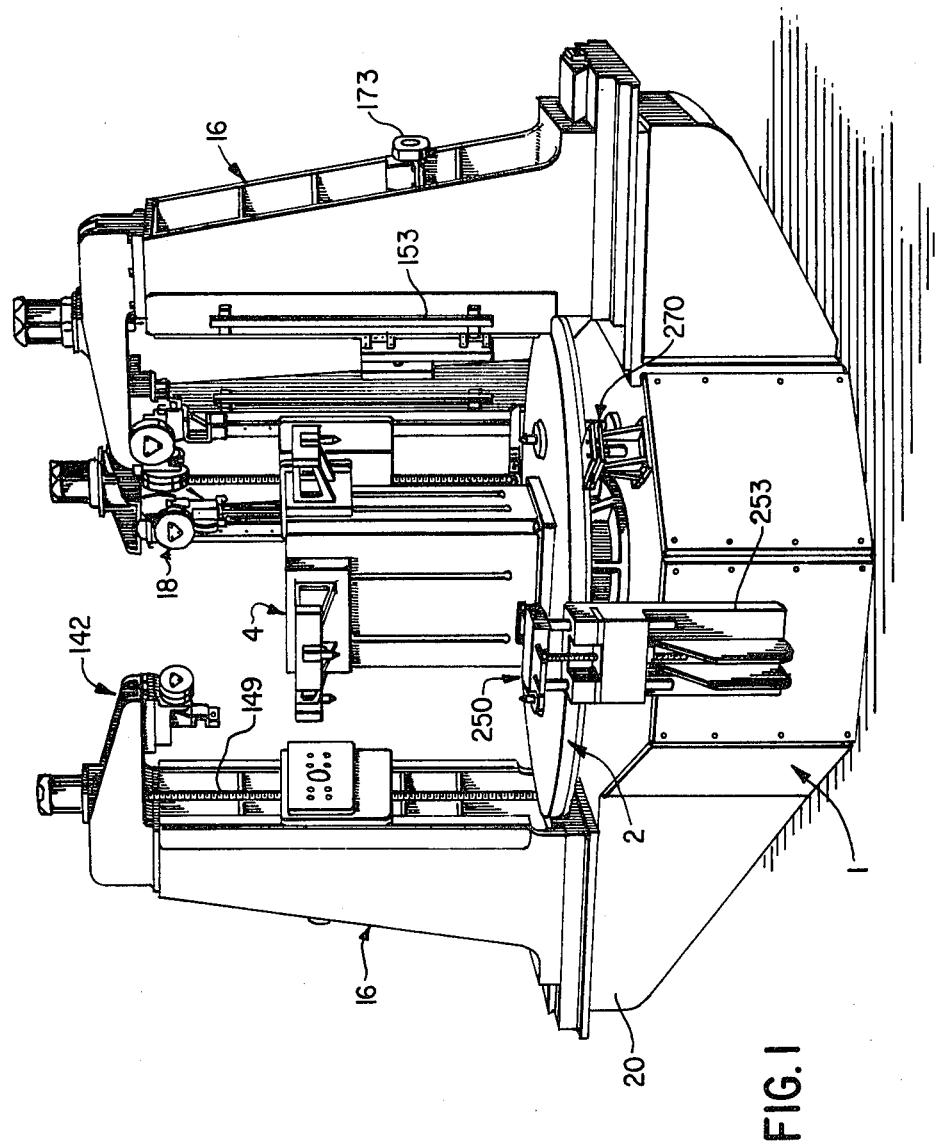
FIG. 1 is a perspective view of the entire machine, various parts being omitted for reasons of clarity.

Referring initially to FIGS. 1 to 3 and 15, the grinding machine comprises a massive base frame structure 1 within which is supported a table assembly 2 for rotation about a vertical axis. The table assembly defines four work holder locations 3 spaced at exact equal angular intervals of 90° about the vertical axis. At each work holder location a workpiece, such as a gear wheel, is adapted to be supported on a vertical axis parallel to the principal axis of the table assembly between centers mounted on a tail stock assembly 4 and a rotatable workpiece locator assembly 82 mounted in the table at each location 3.

Figure 15:
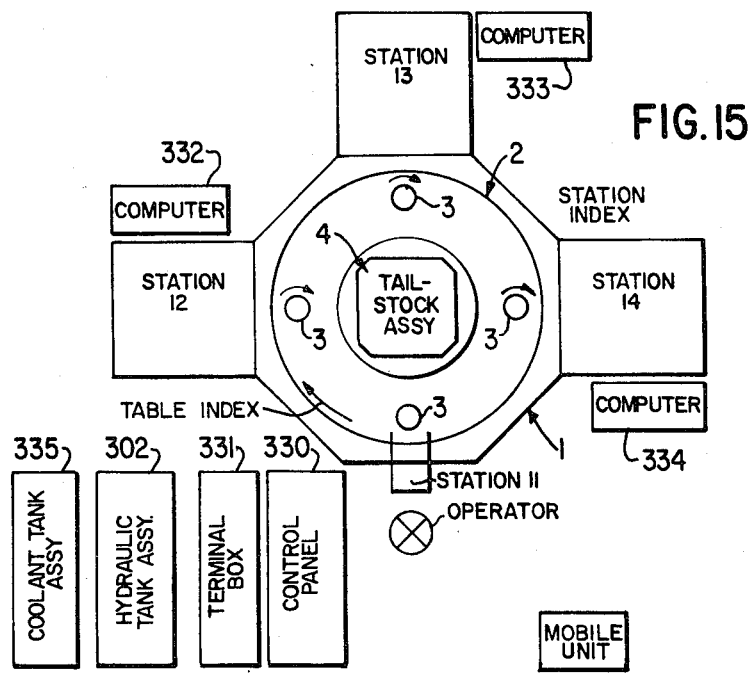
FIG. 15 is a schematic plan view of the grinding machine and its control system.

As indicated by FIG. 15, the base frame 1 defines at the front of the machine a load and unload station 11, and proceeding clockwise therefrom (in the direction of table index movement) and spaced at intervals of exactly 90°, a rough grind station 12, a semi-finish grind station 13, and a finish grind station 14.

Within the lower part of the base frame structure 1 is a table index drive mechanism 15 (FIG. 5) which, as will be explained in greater detail below, operates to index the table assembly 2 through angular increments of 90° to carry each work holder location 3 from the load/unload station 11 successively past the grinding stations 12, 13 and 14.

At each of the grinding stations, the base frame supports a column 16 upon which is carried a grinding assembly 17 which is controlled to move on at least two axes to effect grinding operations on workpieces carried by the table locations 3. At the top of each column 16 is a wheel dressing mechanism 18.

Within the base frame structure 1 at each of the grinding stations 12, 13 and 14 is a station index mechanism 19 (FIG. 4) which is adapted to be coupled to the registering rotatable workpiece locator assembly 82 on the table to present predetermined portions of the workpiece for machining by the grinding assembly 17.

TABLE ASSEMBLY AND INDEXING MECHANISM (FIGS. 3,4,5,6 and 7)

The base frame structure of the machine is of generally octagonal outline in plan view as indicated in FIG. 15 and may be formed as a massive hollow iron casting or as a fabrication welded from solid steel plate. From the sides of the base frame project three radially arranged buttresses (FIG. 1) which form the support for the columns 16. The base frame includes a flat top plate 21 having a central aperture 22 (FIG. 4) in which is carried the mounting structure for the table assembly 2, and three further apertures 24 registering with the grinding stations 12, 13 and 14 and accommodating the station index mechanisms 19. A tubular table bearing housing 25 extends vertically through the central apertures 22, and has a peripheral flange 26 which rests on the plate 21, the housing 25 being secured to the plate 21 by fastener assemblies 27 which pass through aligned apertures in the flange 26 and top plate 21.

Received within the housing 25 is a table base shaft 28 of solid steel construction, this shaft being maintained with its axis precisely vertical, and supported for rotation by an upper cone bearing 29 and a lower cone bearing 30 acting between the shaft and the housing 25. The upper cone bearing 29 is designed to support the axial load imposed by the table assembly 2, and the components mounted thereon, and accordingly is of suitably large dimensions. The lower cone bearing 30 however is substantially smaller since it performs primarily a guiding or centering function.

Figure 5:
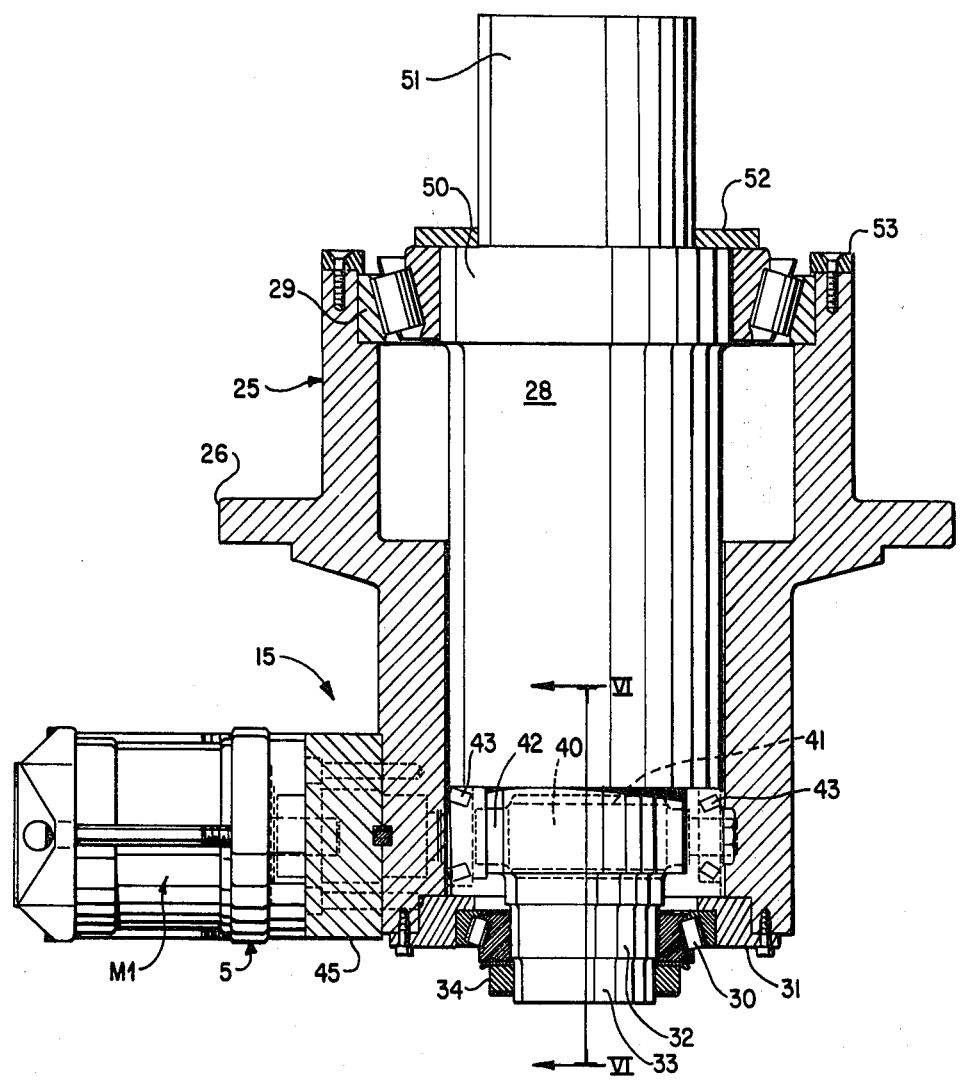
FIG. 5 is a fragmentary sectional view taken on the line V—V in FIG. 2 and illustrating details of the table index mechanism.
Figure 6:
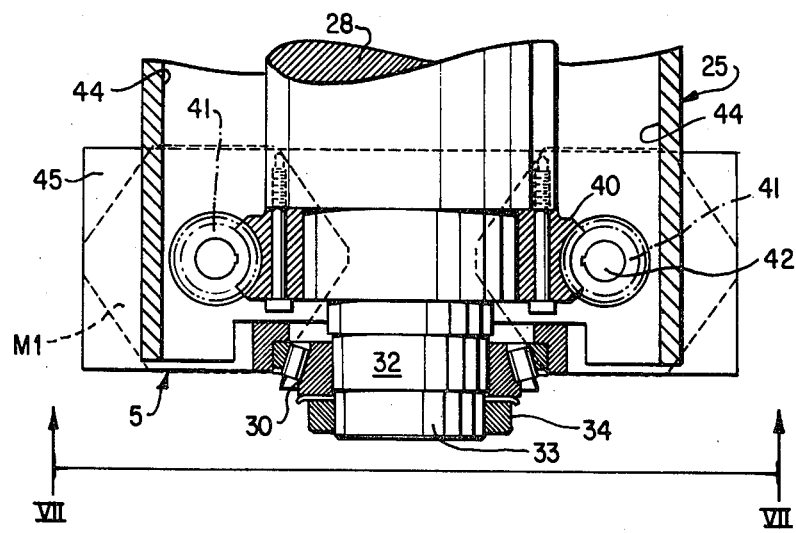
FIG. 6 is a fragmentary sectional view taken on the line VI—VI in FIG. 5.

As best seen in FIGS. 5 and 6, the lower cone bearing 30 is carried in a housing 31 fastened to the underside of the housing 25 and cooperates with a reduced diameter section 32 of the base shaft 28. The shaft 28 has a screw threaded lower end section 33 which is engaged by a lock nut 34 which retains the cone bearing 30 in position, and which can be adjusted to eliminate any play from the bearings 29 and 30.

Figure 7:
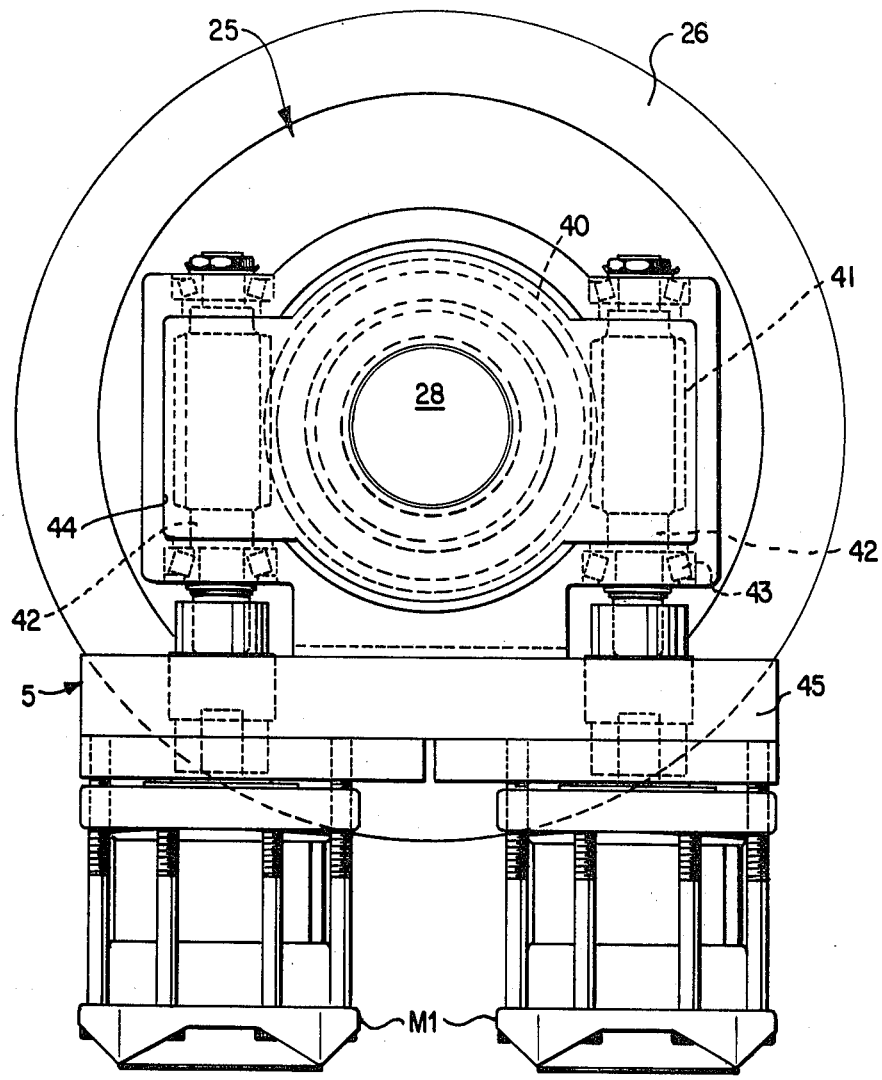
FIG. 7 is a view taken on the line VII—VII in FIG. 6 in the direction of the arrows.

Referring to FIGS. 5, 6 and 7, the table base shaft 28 carries above the lower bearing 30 a worm gear 40 which is in meshing engagement on opposite sides with a pair of worm wheels 41 accommodated in recesses 44 in the housing 25 and carried on shafts 42 supported by cone bearings 43 in the recesses 44. As shown in FIG. 7, the worm gear shafts 42 pass through a mounting block 45 secured to the housing 25 and are coupled to hydraulic Nutron (Trademark) motors $M_1$. These motors are capable of very high torques and extremely accurate control throughout a very wide range of speeds of operation. The provision of a dual worm drive system as described insures extremely high degree of accuracy in the rotary drive movements applied to the shaft 28, eliminating any backlash from the drive system, and avoiding the application of any unbalanced moments to the shaft.

As shown in FIG. 5, the upper end of the table base shaft 28 is formed with a collar 50 around which the upper cone bearing 29 is located, and above the collar a stub shaft 51 of reduced diameter. The lower end of the stub shaft 51 is surrounded by a shaft ring 52 which rests against the collar 50. The bearing 29 is retained in position by an annular bearing cap 53 which is fastened to the housing 25.

The table 54 (FIGS. 3 and 4) is formed by a massive steel casting having a central vertical bore 55 which is received on the stub shaft 51 and non-rotatably secured with respect thereto, as by suitable keying means (not shown). The underside of the table rests upon the shaft ring 52, and its weight is transmitted thereby to the upper cone bearing 29.

Figure 2:
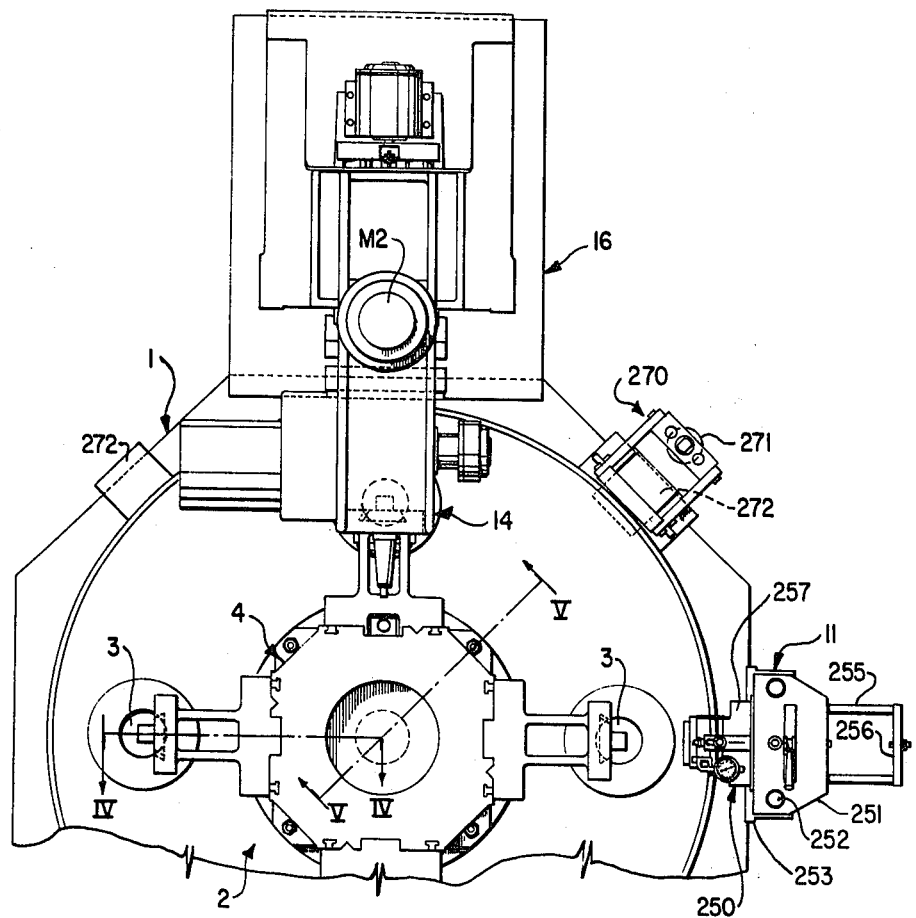
FIG. 2 is a partial plan view of the machine.
Figure 3:
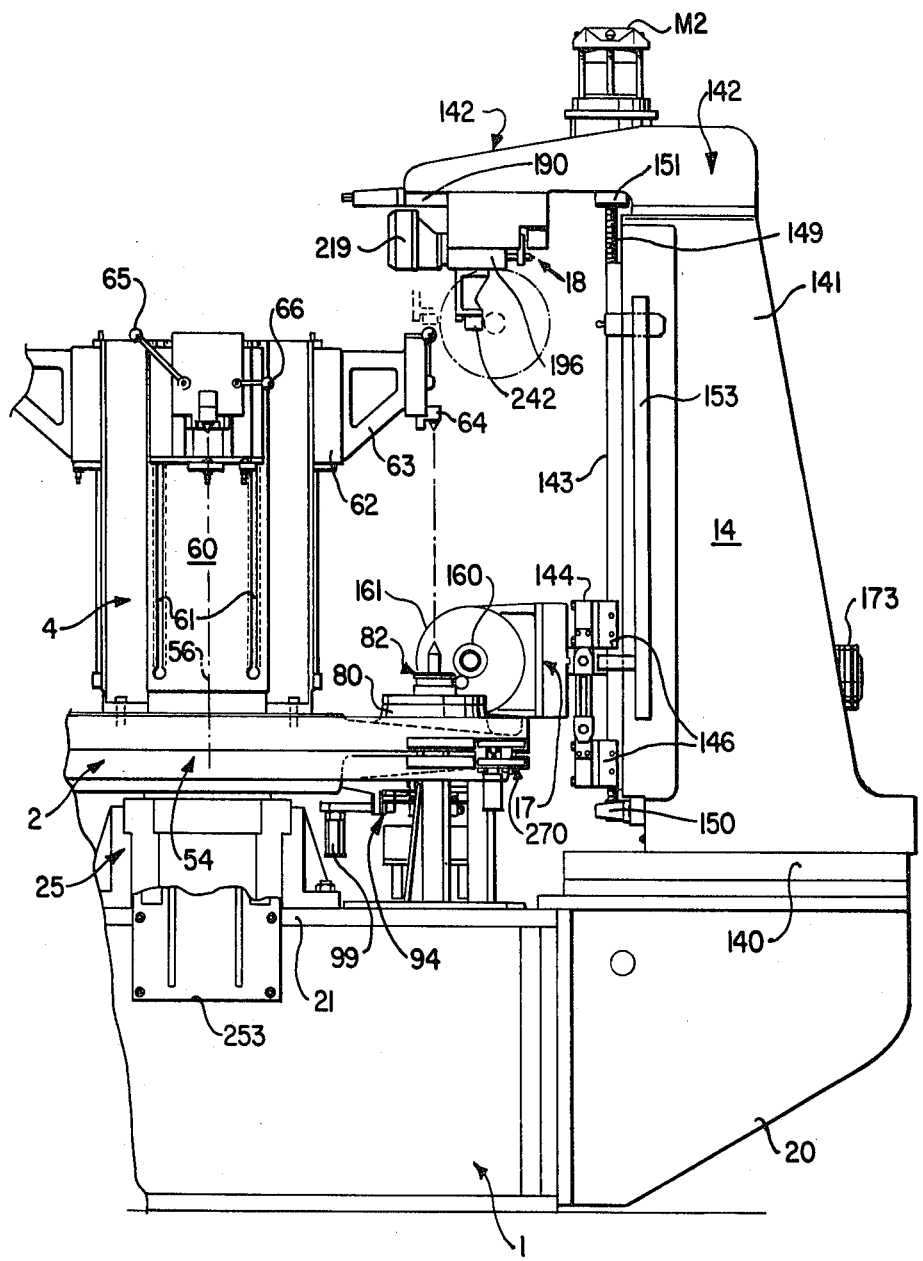
FIG. 3 is a partial elevational view of the machine.

As shown in FIGS. 2 and 3, the tail stock assembly 4 comprises a pillar-like structure of rectangular configuration which is bolted centrally to the upper side of the table 54 in precise vertical alignment to the principal machine axis, i.e. the vertical axis 56 of the base shaft 28. The tail stock 44 is formed with four vertical face plates 60 precisely spaced at identical distances from the axis 56. Each face plate is formed with a pair of vertical T-slots 61 which cooperate with a vertically adjustable mounting block 62 which supports a projecting bracket 63 which in turn carries a vertically oriented back center 64 for support of the workpiece. The assembly constituted by the mounting block 62, brackets 63 and back center 64 is vertically adjustable along the T-slots 61 by suitable means (not shown). For example where the block 62 may carry a nut which cooperates with a lead screw rotatably mounted on a fixed axis on the tail stock so that through cooperation with the nut, rotation of the lead screw adjusts the position of the mounting block vertically along the T-slot 61. The attachment of the back center 64 on the bracket 63 includes an arrangement of key ways and wedges to accommodate adjustment of the axis of the back center 64 in two vertical planes so that it can be located precisely in the position required. Such adjustment means are conventional and need not be described here in detail. The assembly also includes a control lever 65 attached to a mechanism (not shown) to effect vertical displacement of the back center 64 to move it into and out of engagement with the workpiece when the latter is being installed in or removed from the machine respectively. A second lever 66 controls a locking means (not shown) operative to secure the back center rigidly in an advance position when in engagement with the workpiece.

Figure 4:
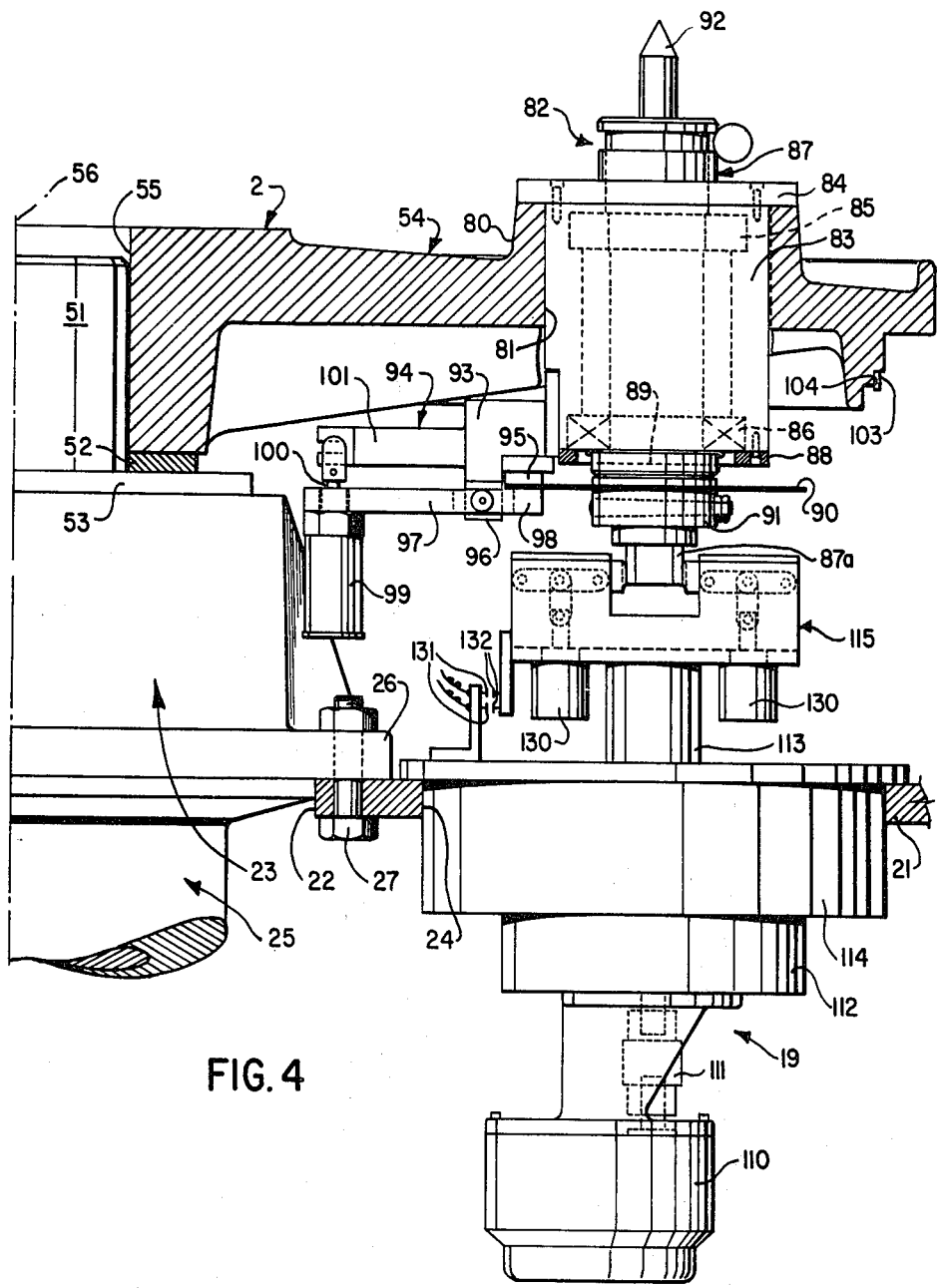
FIG. 4 is a fragmentary perspective view taken on the line IV—IV in FIG. 2 and showing the station index drive mechanism.

The table 54 is formed with four bosses 80 at identical radial spacings from the axis 56 and angularly distributed at precise 90° intervals therearound. As best seen in FIG. 4, each boss surrounds a vertical cylindrical bore 81 which extends entirely through the table and receives a workpiece locator assembly generally indicated at 82. The assembly 82 comprises a cylindrical sleeve 83 of an outside diameter which fits closely within the bore 81 and having at its upper edge a projecting flange 84 which is received against the upper end face of the boss 80. Within the sleeve 83 are received a pair of axially spaced upper and lower precision cone bearing assemblies 85 and 86 which form a rotary mounting for a vertical shaft assembly 87. The lower bearing assembly 86 is retained by an annular cap 88 secured to the sleeve and is loaded by a nut 89 in screw-threaded engagement with the shaft and adjustable axially thereof to eliminate any free play from the bearings 85,86. Beneath the nut 89 the shaft assembly carries a flat annular metal disc 90 which is affixed to the shaft assembly on the underside by a retaining collar 91. The upper end of the shaft assembly supports a vertically arranged centering pin 92 which is adapted to cooperate with a corresponding back center 64 arranged on the tail stock in supporting a workpiece.

A bracket 93 is affixed to the sleeve 83 and extends radially therefrom, this bracket forming a mounting means for a disc brake caliper 94 which is adapted to cooperate with the metal disc 90 on the shaft assembly 87. Thus the bracket 93 supports a fixed brake pad 95 in close proximity to the upper side of the disc 90. Radially outwardly of the periphery of the disc the bracket projects to the other side of the latter and forms a pivotal mounting 96 for an elongate caliper limb 97 which carries a movable brake pad 98 adjacent the underside of the disc 90. On the opposite side of the pivotal mounting 96, the caliper limb 97 supports the cylinder of a hydraulic actuator 99 from which extends a piston rod 100 which is pivotally connected to a fixed arm 101 projecting from the bracket 93.

As will be evident, when the hydraulic actuator 99 is supplied with power, it operates through the disc brake caliper 94 to force the brake pads 95 and 98 into gripping engagement with the opposite sides of the disc 90 thus locking the shaft assembly 87 against rotation. However when the brake is released, the shaft assembly 87 is free to rotate about its vertical axis in the cone bearings 85 and 86.

Figure 18:
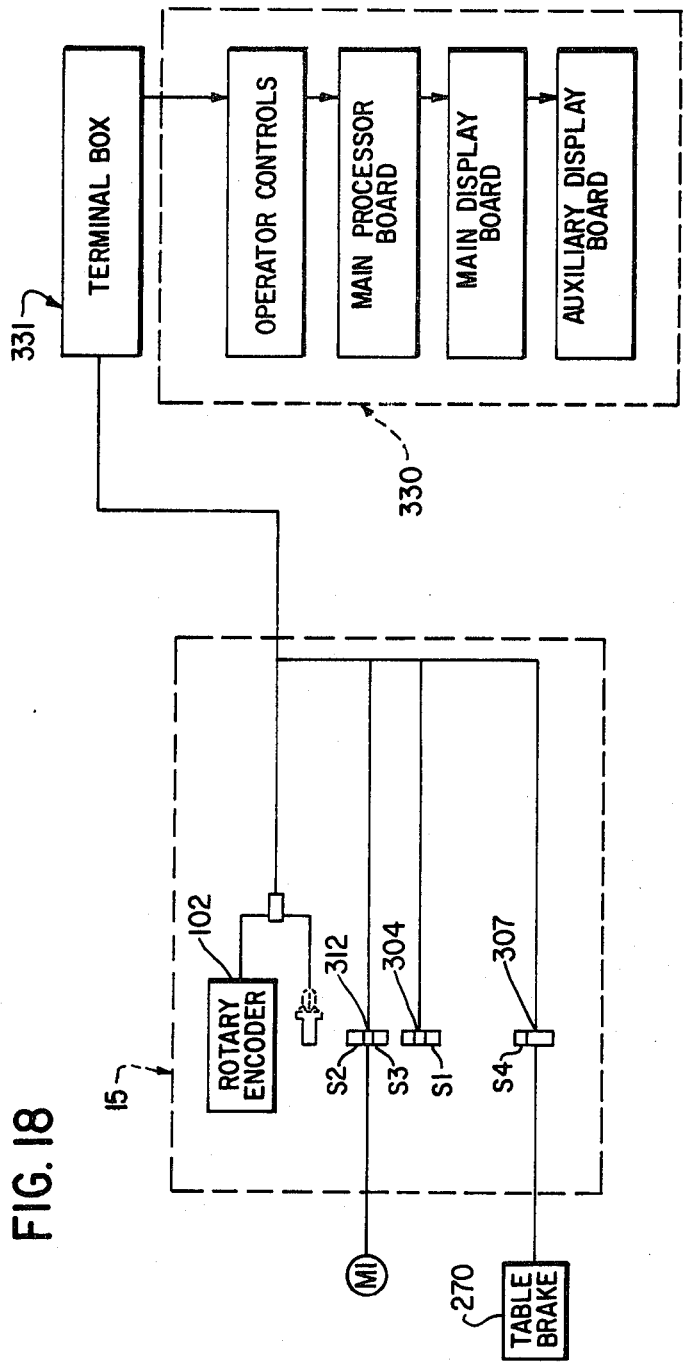
FIG. 18 is a schematic diagram of the main machine control system.

Rotational movements of the table assembly 2 about its central vertical axis 56 are precisely monitored by a rotary encoder 102 (FIG. 18). The encoder 102 comprises a precision toothed rack 103 (FIG. 4) mounted in a specially machined annular seating surface 104 provided on the periphery of the table 54, which cooperates with a pinion gear (not shown) forming part of a "reading" device mounted at a fixed location on the base frame structure 1 and capable of measuring rotary movement of the table in very precise increments. The reading device or rotary encoder is neither illustrated nor described in detail, since it is a proprietary item manufactured by Litton Industries of California U.S.A.

The tooth rack 103 is provided in sections, for example twelve sections, and these sections are made to precisely envelope the circumference of the table around the seat surface 104. The rack has, for example, twenty teeth per inch and is engaged by a pinion of twenty teeth in the rotary encoder, so that the pinion will make one revolution per inch of travel of the rack. In the example described, one revolution of the table will produce 144 revolutions of the rotary encoder. Suitably arranged proximity switches are provided to give a signal providing a zero reference on each full revolution of the table. Through the encoding device, the number of increments counted per revolution of the table is 1,440,000. This gives a resolution of slightly less than one arc-second. The zero reference is accepted as plus or minus one arc-second, and the positioning accuracy of the table is plus or minus two arc-seconds.

STATION INDEX DRIVE MECHANISM (FIG. 4)

As mentioned above, a station index drive mechanism 19 is provided in the base frame 1 of the machine at each of the grinding stations 12, 13 and 14, and one such index mechanism is illustrated in FIG. 4. Each mechanism 19 is supported within a corresponding aperture 24 in the base frame top plate 21 and comprises a D.C. drive motor 110 having an output shaft coupling 111 connected to a fail-safe electromagnetic brake 112 from which extends a vertically oriented drive shaft 113. The drive shaft 113 extends axially through a precision rotary encoder 114 which is capable of measuring rotation of the shaft 113 during indexing movement to an extreme degree of accuracy, e.g. to less than 2 arc-seconds. This rotary encoder may be a propietary device, such as that sold by Tri-Optic Ltd. of England, which uses a precision ground glass screen with radially engraved graduations and an optical reading device such as a photoelectric cell to determine the radial position of the encoding device. For example, the Tri-Optic Ltd. encoder has 36,000 lines per revolution and through a photoelectric cell transmits an analog signal to an interpolator. The analog interpolator produces bydirectional counts at the rate of twenty times the number of lines or twenty ×36,000 =720,000 counts per revolution. This gives an accuracy of plus or minus 1.8 arc-seconds.

The upper end of the drive shaft 113 carries a gripper assembly 115 adapted to form a disengageable connection with a squared lower end section 87a of the shaft assembly 87.

Figure 4A:
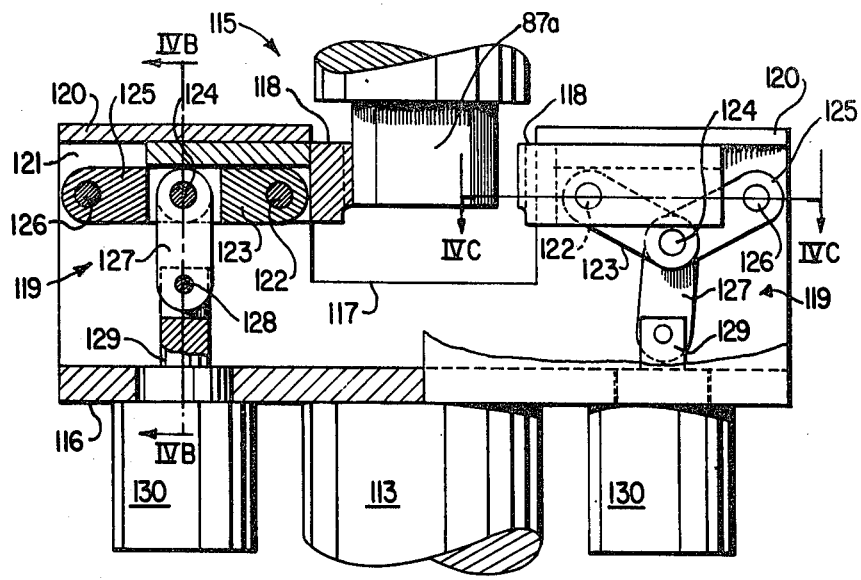
FIG. 4A is an enlarged fragmentary view of a portion of FIG. 4, and partially sectioned.
Figure 4B:
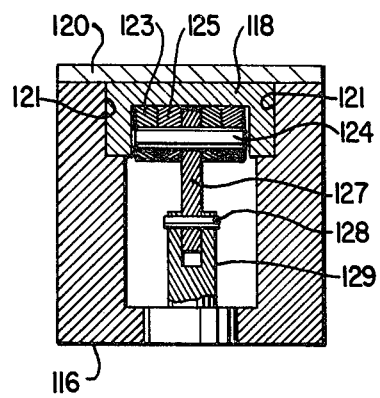
FIG. 4B is a sectional view taken on the line IVB—IVB in FIG. 4A.
Figure 4C:
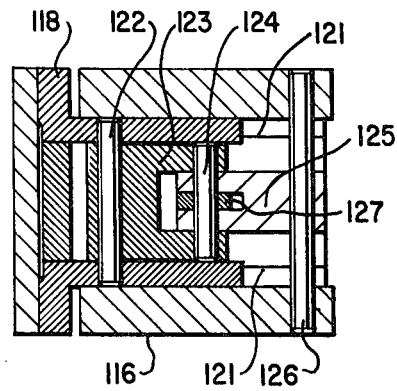
FIG. 4C is a sectional view taken on the line IVC—IVC in FIG. 4A.

The gripper assembly 115 is more clearly illustrated in FIGS. 4A through 4C and comprises a slide block 116 rigidly affixed at right angles to the axis of the shaft 113. The slide block 116 is of channel-shaped configuration having a central transverse bight 117 to receive the squared end 87a of the shaft assembly 87. Opposed faces of the squared end 87a are adapted to be engaged and gripped by a pair of jaws 118 guided for movement in opposite sides of the slide block 116 and actuable between an advanced position as shown in the left hand side of FIG. 4A, where the jaws are in gripping engagement with the shaft end section 87a, and a retracted position as shown in the right hand side of FIG. 4A, by means of a toggle mechanism 119.

As seen in FIG. 4B, the slide block 116 is of U-shaped configuration, the opposite ends of which are each closed by a cover plate 120. Each limb of the U is formed with a rectangular recess 121 which cooperates with the cover plate in defining a guide channel for sliding movement of the jaw 118 longitudinally of the slide block 116, i.e. towards and away from the shaft end section 87a. The portion of the jaw 118 received within this guide channel is of inverted U-shaped configuration and carries a transverse pivot pin 122 forming a pivotal connection between the jaw 118 and a link 123. The opposite end of the link 123 is bifurcate and carries a second pivot pin 124 which forms a pivot connection to one end of a further link 125, the opposite end of which is mounted on a third pivot pin 126 carried in the slide block 116.

Also pivoted on the second pivot pin 124 is a further link 127 which extends generally parallel to the shaft 113 and has its opposite end connected to a fourth pivot pin 128 carried in a clevis in an actuator rod 129 connected to a solenoid 130.

Operation of the toggle mechanism can be gleaned from comparing the two sides of FIG. 4A. In the left hand side, the jaw 118 is advanced and the axis of the three pins 122, 124 and 126 are substantially aligned. Spring means (not shown) are included to urge the toggle mechanism to this condition. The right hand side of FIG. 4A illustrates the condition after the solenoid 130 has been actuated to retract the rod 129 against the spring force. This movement of the rod 129 is transmitted through the link 127 to move the pin 124 downwardly. Since the pin 126 is fixed to the slide block 116, the reaction through the links 125 and 123 thus causes the jaw 118 to be retracted from engagement with the shaft end 87a to the position shown in full lines, the jaw 118 being guided linearly during this movement in the guide channel formed by the recesses 121. The toggle mechanisms 119 are, of course, actuated in unison to effect advancement or retraction of the jaws 118. The solenoids 130 are supplied with power through a pair of fixed contacts 131 mounted in the machine bed, and a pair of moving contacts 132 carried on the gripper assembly 115. Power is therefore available to the solenoids 130 only at one position of rotation of the gripper assembly. However the solenoids require to be energized only in this one angular position of the gripper assembly to disengage the squared shaft end 87a when the table is to be indexed. During operation of the station index mechanism 19 the solenoids are de-energized and the jaws engaged.

The components of the gripper assembly 115 including the slide block 116 and the toggle mechanism 119 are manufactured to very close tolerances, since it is essential that there be no play in the driving connection which is established between the station index mechanism 19 and the shaft assembly 87. Accordingly, in the advanced position of the jaws 118 as shown in the left hand part of FIG. 4A, the axis of the pin 124 is arranged to be slightly below the plane containing the axes of the pins 122 and 126 so that any play which might in use develop through wear of the components of the toggle mechanism 119 can be taken up by the axis of the pin 124 being moved further towards that plane under the influence of the spring means.

The station index mechanism 19 and gripper assembly 115 as described above are provided at each of the grinding stations 12, 13 and 14 but not at the load/unload station 11 since no controlled indexing of the workpiece at station 11 is required. Nevertheless it is essential to prevent inadvertant rotation of the workpiece at the load/unload station 11 since the disc brakes 94 at all of the stations will be released simultaneously, and while the workpieces at grinding stations 12, 13 and 14 will at that time be controlled by the respective index assemblies 19, there is no such constraint upon the workpiece at station 11. Accordingly a stationary solenoid-controlled disc brake (not shown) is provided at station 11 to engage the disc 90 of the assembly 82 at that station and be operated in the opposite phase to the brakes 94, i.e. when the brakes 94 are released, the stationary brake is engaged, and vice versa.

GRINDING WHEEL INFEED MECHANISM (FIGS. 1, 3, 11 and 12)

Each of the columns 16 at the respective grinding stations 12, 13 and 14 has a base section 140 supported on the respective buttress 20, and two upstanding spaced parallel reinforced walls 141. The walls 141 are interconnected at their upper ends so that the column 16 forms what is essentially an open box structure and supports at its upper end a cantilevered head beam 142 upon which the wheel dressing mechanism 18 is carried.

Figure 11:
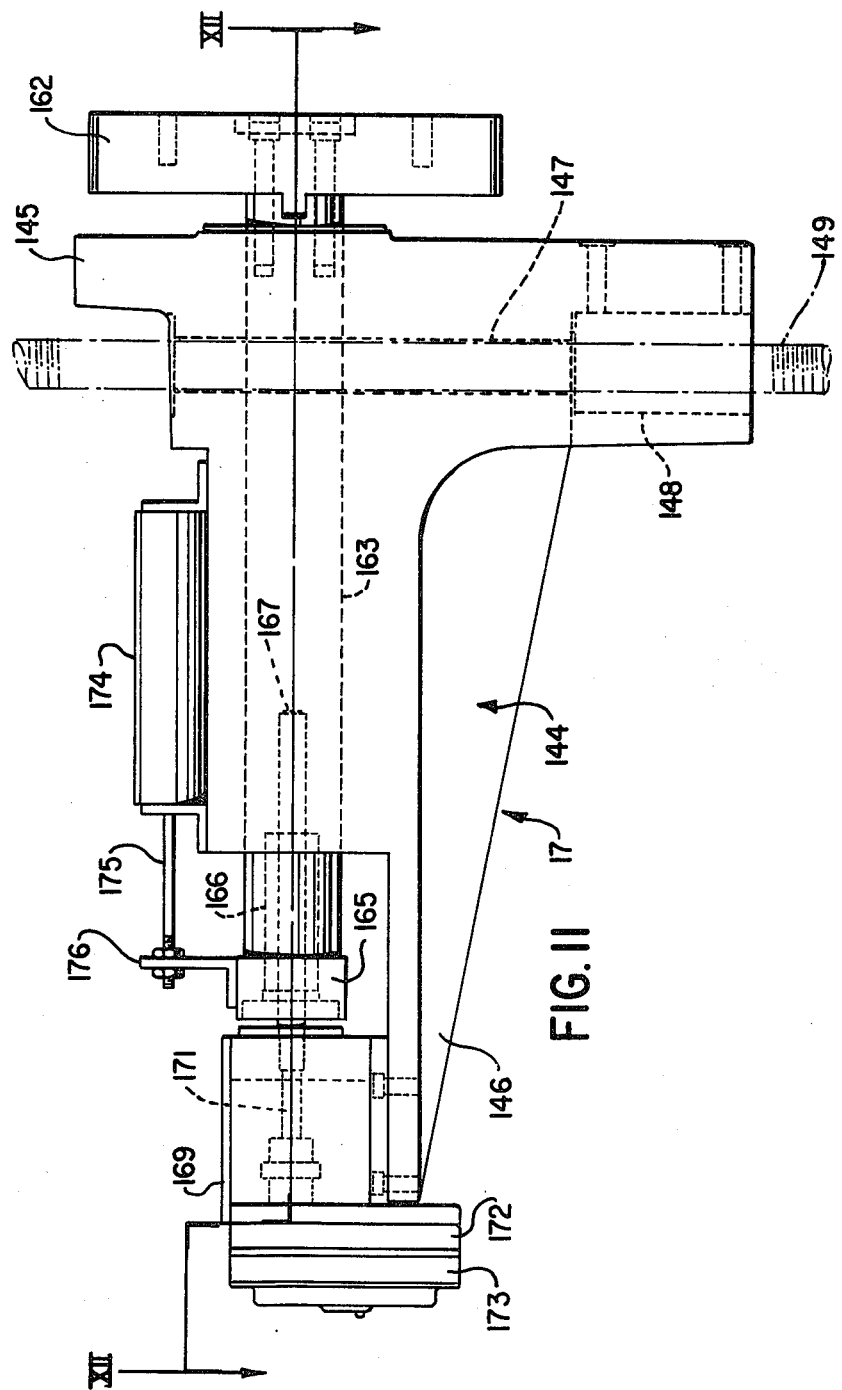
FIG. 11 is a view in elevation to an enlarged scale showing details of the grinding wheel infeed mechanism.
Figure 12:
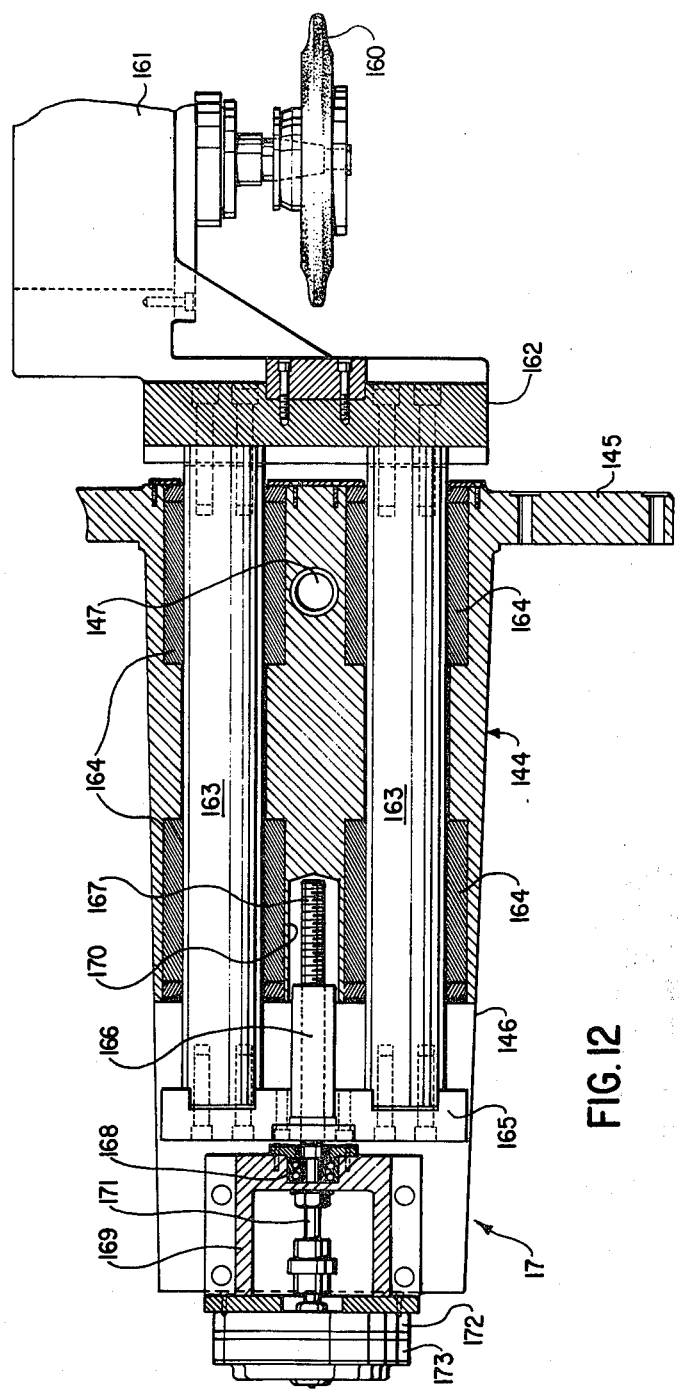
FIG. 12 is a sectional view taken on the line XII—XII in FIG. 11.

The front sides of the column walls 141, i.e. the sides directed radially inwards towards the principal machine axis 56, define vertical guideways 143 for the sliding vertical movement of the carriage 144 of the infeed mechanism 17. The carriage 144 is best shown in FIGS. 11 and 12 and comprises a vertical front plate section 145 carrying sliding bearing means 146 for engagement with the guideways 143 and a cantilevered rearward section 146 which extends outwardly between the walls 141 of the column 16. Close to the front plate 145 the carriage defines a vertical bore 147 the lower end of which carries a captive nut 148.

The nut 148 is in screw-threaded engagement with a lead screw 149 which extends vertically centrally on the open front of the column 16 and is supported at its lower ends in a bearing 150 carried at the base of the column and at its upper end in a bearing 151 carried on the head beam 142.

The lead screw 149 is connected at its upper end through a coupling (not shown) to a precisely controllable hydraulic motor M2. The motor M2 is preferably of the type sold by Nutron Corporation, of Hingham, Mass., USA, under the trade name "Nutron". It should be evident that actuation of the motor M2 to rotate the lead screw 149 will effect through cooperation with the captive nut 148 vertical movement of the carriage 144 along the guidways 143 on the column, the speed and direction of this movement corresponding to the speed and direction of rotation of the motor M2. Movements of the carriage 144 vertically of the column 16 are monitored by a linear encoder 153 vertically arranged on the latter.

A grinding wheel 160 (FIG. 12) is carried on a drive head 161 which is in turn attached to a mounting plate 162 carried on a pair of parallel cylindrical guides 163 which extend horizontally through the carriage 144 and are guided for movement in precision linear bearings 164. The rear ends of the guides 163 are interconnected by a transverse tie bar 165 which supports a captive nut 166 centrally between the guides 163. The nut is in screw-threaded engagement with a lead screw 167 rotatably mounted in a precision bearing 168 in a bracket 169 attached to the rear section 146 of the carriage 144. As shown in FIG. 12, the terminal section of the lead screw 167 is received in an oversize bore 170 in the carriage.

The lead screw 167 is connected through a coupling 171 to a 50:1 reduction gear 172 which is driven by a low voltage D.C. motor 173.

As will be evident, rotation of the motor 173 acts through the reduction gear 172 and coupling 171 to rotate the lead screw 167. Through cooperation with the captive nut 166, such rotation accordingly effects linear movement of the guides 163 to effect infeed or outfeed movements of the grinding wheel. It will be observed that this infeed mechanism is symmetrical with respect to the carriage, and that the axis of the lead screw 167 lies in the plane of the grinding wheel. This ensures that the accuracy of infeed movements imparted to the grinding wheel is extremely precise in relation to the rotational movements of the motor 173.

Infeed movements of the grinding wheel are monitored by a linear encoder 174 the body of which is mounted on the carriage 144. A rod 175 extending from the encoder 174 is attached to a bracket 176 carried by the tie bar 165. Accordingly, the rod 175 moves synchronously with the grinding wheel, and these movements are sensed by the encoder 174.

DRESSING MECHANISM (FIGS. 1, 3, and 8 to 10)

Figure 8:
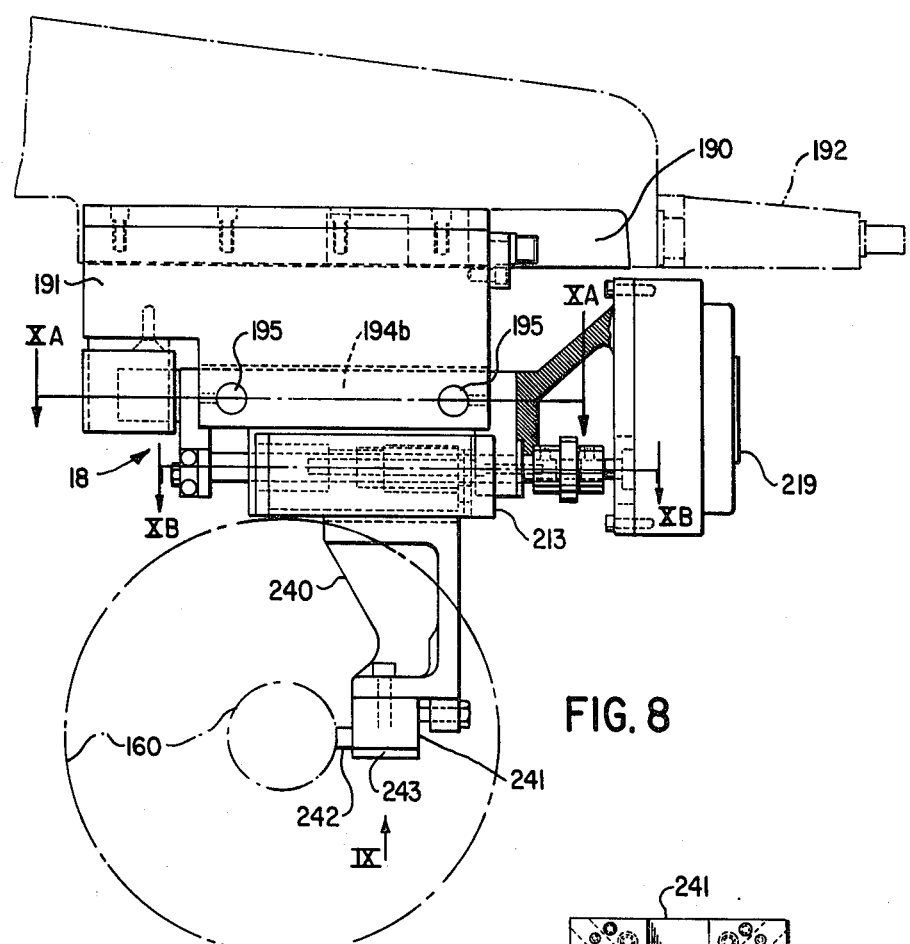
FIG. 8 is an enlarged side view illustrating details of the grinding wheel dressing mechanism.

As will be evident from the foregoing, the wheel dressing mechanism 18 is supported on the head beam 142. As shown in FIGS. 3 and 8, the head beam 142 has on its underside a horizontal guideway 190 that extends radially with respect to the principal vertical axis 56 and cooperates with a dresser carriage block 191 slidable along the guideway. In conventional manner, the carriage block 191 cooperates with a lead screw 192 in the head beam 142 by means of a captive nut (not shown) on the carriage block so that when the lead screw 192 is rotated (as by means of a crank lever) the carriage block 192 is moved along the guideway 190, i.e. radially with respect to the machine axis 56. A lever 193 on the carriage block 191 controls a locking means (not shown) whereby the carriage block 191 may be locked to the head beam 142 at any selected position of adjustment longitudinally of the guideway 190.

The carriage block 191 is recessed on its underside to define a pair of depending limbs 194a, 194b (FIG. 10a) which are spaced apart and interconnected by a pair of horizontal guide pins 195 affixed thereto and extending generally transverse to the length of the head beam 142, i.e. in a tangential direction with respect to the machine axis 56.

A carriage 196 is guided for movement longitudinally of the pins 195, the pins extending through the carriage and being received by precision linear bearings 197 in the carriage 196. The limb 194a has a central bearing structure 199 in which is supported a lead screw 200. This lead screw is in screw-threaded engagement with a nut 198 supported in the carriage 196, and is connected through a coupling 201 to a low voltage D.C. motor 202 mounted on a bracket 203 attached to the limb 194a.

As will be evident, actuation of the D.C. motor 202 to drive the lead screw 200 will operate through the nut 198 to move the carriage 196 longitudinally of the guide pins 195, movement in this direction hereinafter being referred to as movement in the X-axis.

Figure 10A:
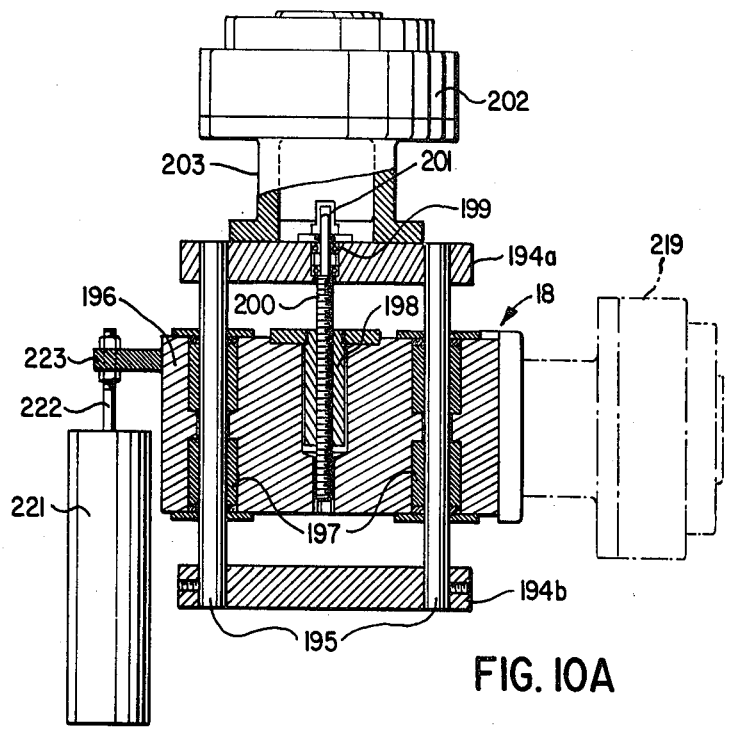
FIG. 10A is a sectional view taken on the line XA—XA in FIG. 8 and illustrating the drive control arrangement of the dressing mechanism.
Figure 10B:
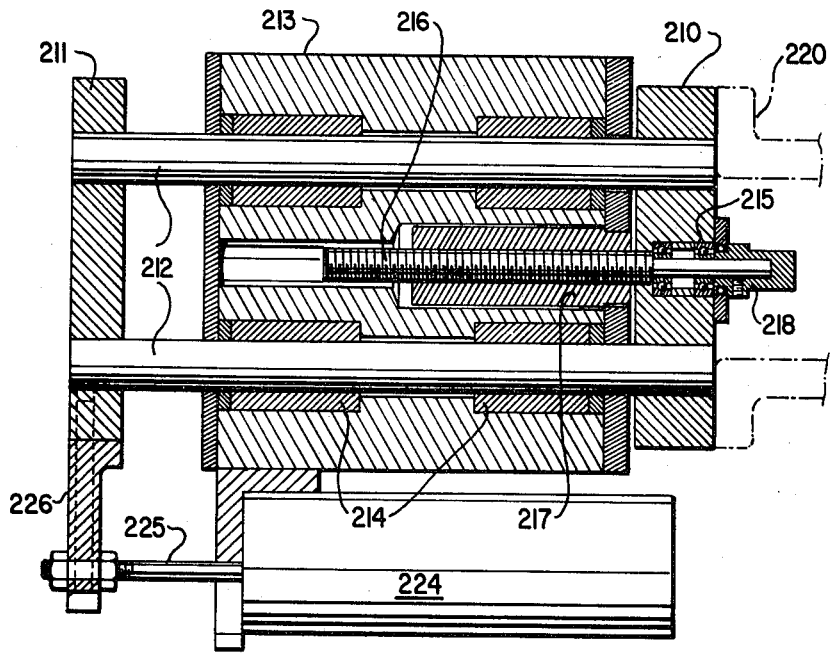
FIG. 10B is a similar sectional view taken on the line XB—XB in FIG. 8.

The X-axis carriage 196 is as shown in FIG. 10b formed with a pair of depending spaced vertical limbs 210 and 211 which lie in planes at right angles to the limbs 194a, 194b. The limbs 210, 211 are spanned by a pair of horizontal guide pins 212 which extend at right angles to the pins 195 in a direction referred to as the Y-axis direction. A further carriage 213 is guided for movement longitudinally of the pins 212 by linear bearings 214. A bearing 215 is supported for rotation in the limb 210 and guides a lead screw 216 which is in threaded engagement with a nut 217 carried in the carriage 213. A lead screw 216 is connected through a coupling 218 to a D.C. motor 219 supported on a bracket 220 on the limb 210.

Actuation of the motor 219 to rotate the lead screw will be effective to move the carriage 213 longitudinally of the guide pins 212 (i.e. in the Y-axis direction).

Movement of the carriages 196 and 213 along the X-axis and Y-axis respectively are monitored by linear encoders. First, referring to FIG. 10a, a linear encoder 221 is carried on the carriage block 191 and has a rod 222 extending therefrom parallel to the guide pins 195 and affixed to a bracket 223 mounted on the carriage 196. Thus the rod 222 follows movements of the carriage 196 along the X-axis with respect to the carriage block 191. Similarly a linear encoder 224 is mounted on the carriage 196 and has a rod 225 extending therefrom in a direction parallel to the guide pins 212 and affixed to a bracket 226 attached to the limb 211 of the carriage 196.

Accordingly movements of the carriage 213 upon actuation of the DC motor 219 and in the longitudinal direction of the pins 212 (i.e. in the Y-axis direction) are sensed by the encoder 224.

The linear encoders 221, 224 of the dressing mechanism as well as the infeed encoder 174 and the vertical or grinding stroke encoder 153 are proprietary items such as those sold by Tri-Optic Ltd., of England, and have well known characteristics. For example each dressing encoder 222, 224 employs a glass screen engraved with 50 lines per millimeter and includes a reading device having an analog interpolator which has a resolution of 20 times the number of lines. This provides a measuring accuracy of plus or minus one micro-meter. The infeed encoder 174 and guiding stroke encoder 153 do not require the same degree of accuracy and need only be sensitive to plus or minus 5 micrometers.

Figure 9:
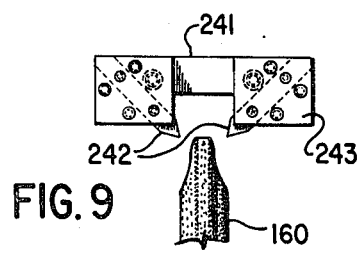
FIG. 9 is a detailed view taken in the direction of the arrow IX in FIG. 8, and further illustrating the dressing mechanism.

A further bracket 240 is rigidly affixed on the underside of the carriage 213, and supports on its underside a fixture 241 in which is secured a pair of diamond-tipped dressing cutters 242 (FIG. 9). The dressing cutters 242 are retained in the fixture 241 by means of cover plates 243 so that they can be removed and replaced as necessary.

FIG. 8 indicates the relative position of the dressing cutters 242 to the grinding wheel when the latter is in the dressing position, the circles shown in broken lines indicating the largest diameter and smallest diameter grinding wheel which can be accommodated in the machine. By suitable numerically controlled actuation of the Y-axis motor 219 and the X-axis motor 202 the dressing cutters 242 can be caused to trace out a predetermined pattern in the horizontal plane and act upon the grinding wheel to impart any desired profile thereto.

Figure 14:
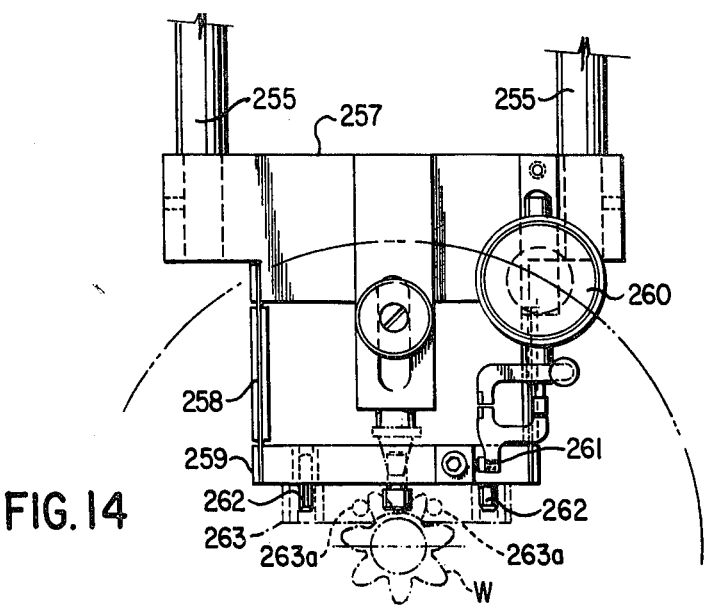
FIG. 14 is a partial plan view of the setting mechanism.

SET UP MECHANISM (FIGS. 22 and 14)

At the load/unload station 11 at the front side of the machine is located a set up mechanism 250 by means of which workpiece such as semi-finished gear blanks, may be inserted in the grinding machine between the centers 64 and 92 and secured to the workpiece locator assembly 82 in the desired orientation about the axis of the shaft assembly 87 so as to be presented in an exactly predetermined orientation to the grinding wheel at the grinding station 12, 13 and 14 when the table assembly 2 is indexed to carry the workpiece to these stations in succession.

The set-up mechanism (see FIG. 14) comprises a main carriage 251 carrying a pair of spaced vertical guide shafts 252 slidable in linear bearings (not shown) in a mounting block 253 on the side of the base frame 1. The main carriage is vertically adjustable and can be locked at a selected vertical location. The carriage 251 includes linear bearings (not shown) which guide a pair of parallel horizontally oriented shafts 255 which extend essentially radially of the table axis 56 and have rear ends connected to a cross-piece 256 and forward ends connected to a carriage 257. The carriage 257 supports a pair of spaced vertically arranged leaf springs 258 projecting therefrom. A bridge 259 is supported between the forward ends of the springs 258 and is arranged to be displaceable laterally in the horizontal direction against the springs 258. A dial indicator 260 mounted on the carriage 257 has a probe 261 engaging an abutment on the bridge such that lateral deflections of the bridge from its central position are displayed on the indicator.

The bridge 259 carries a pair of accurately located dowel pins 262 forwardly projecting therefrom and adapted to locate a tooling gauge 263 (indicated in broken lines) corresponding to the specific gear form of the workpiece W (shown in broken lines). The gauge 263 carries a pair of vertical gauge pins 263a spaced thereon.

Figure 13:
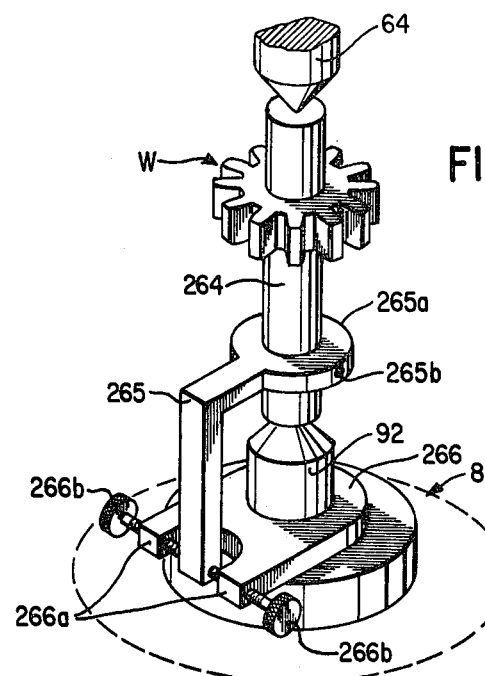
FIG. 13 is a fragmentary perspective view showing details of the workpiece drive and setting mechanism.

As indicated in FIG. 13 the workpiece W is carried on a mandrel 264 between the vertically spaced tailstock centre 64 and lower centre 92 and is drivingly coupled to the locator assembly 82 by means of a drive dog 265. The drive dog 265 has a collar 265a in which the mandrel 264 is received and clamped by a grub screw 265b. A depending leg 265c of the dog 265 extends between a pair of spaced arms 266a of a plate 266 clamped to the shaft assembly 87. The leg 265c is engaged between a pair of opposed adjusting screws 266b in the arms 266a.

From the above it will be evident that the drive dog 265 forms a driving connection from the locator assembly 82 to the workpiece and that the angular position of the latter with respect to the assembly 82 can be selectively varied by means of the adjusting screws 266b.

When a fresh workpiece W is to be set up in the machine at the load/unload station 11, it is positioned on its mandrel 264 as shown in FIG. 13. It is desired that the workpiece should be at an angular orientation on its centres such that a tooth gap is precisely aligned with the radial direction of the machine table, so that when the table is indexed to carry the workpiece to the first grinding station 12, it is presented in proper alignment with the grinding wheel. Thus with the locator assembly 82 firmly clamped, the operator initially registers the workpiece W by eye and then clamps it in position by means of the grub screw 265b and the adjusting screws 266b. The carriage 257 is then advanced radially towards the central axis of the table so that the gauge pins 263a come into contact with the flanks of teeth of the workpiece on opposite sides of the tooth gap which is to be registered. Since the initial set up has been performed only by eye, the tooth gap will not be precisely registered, and one of the pins 263a will contact the tooth flank before the other, resulting in a lateral deflection of the bridge 259. The magnitude of this deflection will be recorded on the dial gauge indicator 260, and the operator will then make an appropriate adjustment in the angular orientation of the workpiece W with respect to the locator assembly 82 by means of the adjusting screws 266b. This process is repeated until the gauge pins 263a can be brought into contact with the workpiece simultaneously, and without lateral deflection of the bridge 259. The workpiece W is then properly located.

TABLE BRAKE MECHANISM

As indicated in FIG. 2, a disc brake assembly 270 is mounted on the base frame structure 1 between the finish grind station 13 and the load/unload station 11. The brake 270 includes a hydraulic actuator 271 and is adapted to cooperate with a selected one of four disc segments 272 which are attached to the periphery of the table assembly 2. When the table assembly has been rotated to a position wherein the work holder locations 3 thereon are in precise register with the grinding stations 12, 13 and 14, one of the four disc segments 272 is aligned with the brake 270, and the latter is operated by means of its hydraulic actuator 271 to engage that disc segment and secure the table assembly in immobile condition. As will be explained, the brake 270 is released to disengage the disc segment 272 during indexing. The brake 270 is normally closed (i.e. fail safe) and requires hydraulic pressure to release it and allow table to rotate.

HYDRAULIC CONTROL CIRCUIT

Figure 16:
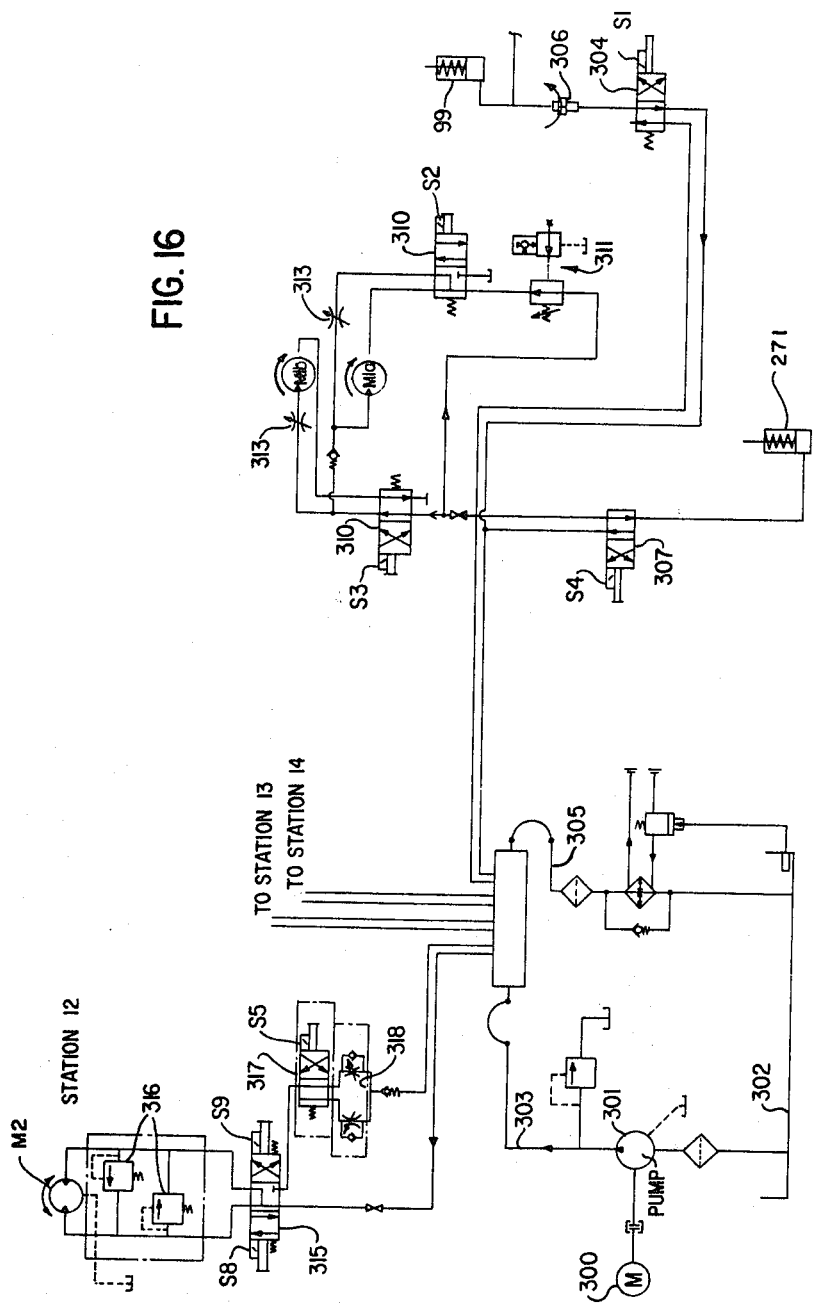
FIG. 16 is a schematic circuit diagram of the hydraulic control system of the grinding machine.

As described above, various of the machine movements are hydraulically powered and the hydraulic control circuit will now be described with reference to the simplified schematic layout shown in FIG. 16.

An electric motor 300 when energized drives a pump 301 to deliver hydraulic fluid from a reservoir 302 to a supply line 303. From the line 303 fluid is delivered via a 2-position control valve 304 actuated by a solenoid S1 to the hydraulic actuators 99 for the brakes which lock the shaft assemblies 87 at the workholder locations 3 on the table. When the solenoid S1 is deenergized the valve 304 is moved by spring force to the position shown, connecting the actuators 99 to a drain line 305. Since the actuators 99 are carried by the table assembly 2 and rotate therewith, they are supplied with fluid through a rotary valve 306.

The supply line also delivers fluid under pressure to the table index brake actuator 271 through a 2-position valve 307 controlled by a solenoid S4.

Fluid from the supply line is delivered to the two table index motors M1a and M1b (which are connected in parallel) through respective direction control valves 310 actuated by solenoids S2 and S3, one of the motors having in series with it a flow control unit 311 formed by a servo-controlled pressure reduction valve, which ensures that the power supplied to the motors M1 is unequal, so that there is no play in the table drive mechanism. The speed of operation of each motor M1 is controlled by a regulator 313 which is in series with it and can be adjusted to regulate the throughput of fluid.

The hydraulic sequence required for indexing the table is as follows:

1. With the table stopped the motors are in opposition to each other: i.e. motor M1a tries to drive the table clockwise; motor M1b tries to drive the table anticlockwise. Motor M1a at this time is subject to a pressure of 250 p.s.i. or less. Motor M1b is at system pressure.

2. At the signal to start, motor M1b is switched to a clockwise rotate mode: i.e. to assist rather than oppose motor M1a. Also at this time the pressure to motor M1a ramped up to system pressure. This gives a controlled acceleration of the table from rest.

3. At the signal to decelerate, the pressure to motor M1a reduced by the valve 311 down to a value that, in conjunction with the speed control of motor M1b, results in the desired creep speed: i.e. 1 RPM. The acceleration and deceleration curve can be changed by controlling the M.a. signal feed to the Servo Valve 311.

4. When the desired table index position is reached the motor M1b is switched by solenoid S3 to oppose motor M1a and the table is then held under the opposing motor torques, with close positioning being maintained by the table clamp brake 270.

The supply line 303 also delivers fluid to power the hydraulic motors M2 at each of the grinding stations 12, 13 and 14 to drive the lead screws 149 which raise or lower the grinding carriages 144. The circuitry of each of these stations is identical and only station 12 is illustrated. Fluid from the supply line 303 is delivered to a 3-position valve 315 controlled by solenoids S8 and S9 which are activated selectively to drive the motor M2 in one direction or the other. When both solenoids are de-energized the valve is restored by spring means to its central position. Cross-port relief valves 316 are connected in parallel with the motors M2.

A two-position flow valve 317 is connected in the return line from the valve 315 and is controlled by a solenoid S5. In series with the valve 317 is an adjustable flow regulator 318 by means of which the speed of operation of the motor M2 is controlled.

The hydraulic circuit also includes other components such as check valves, filters, relief valves, strainers and temperature controls, in accordance with normal hydraulics practice, but since these are of conventional nature no description of them is included.

OVERALL CONTROL SYSTEM (FIGS. 15 to 19)

As should be evident from the foregoing description, the sequence of operations performed in the grinding machine is as follows:

1. At the load/unload station 11, the operator inserts a workpiece between the back center 64 on the tail stock and the centering pin 92 in the locator assembly 82, and with the aid of the set up mechanism 250 positions the workpiece in the required orientation about the axis defined by the centers (the C axis).

2. The table assembly 2 is then indexed through 90° to carry this workpiece to the rough grind station 12, and is locked in position when the registering position has been achieved. During this indexing movement workpieces previously at grinding stations 12, 13 and 14 are indexed to the succeeding station 13, 14 and 11 respectively, the finished ground workpiece from station 14 then being removed at station 11 before a new workpiece is inserted.

3. The sequence of operations at each of the grinding stations 12, 13 and 14 is identical, and will be described only in relation to station 12. When a fresh workpiece is indexed on the table assembly 2 to station 12, the station index mechanism 19 is actuated to form a driving connection through the gripper assembly 115 with the shaft assembly 87, the disc brake 94 at the same time being released to permit rotation of the workpiece under the control of the station index mechanism 19. At this stage the grinding wheel is in a "home" position (wherein it is aligned with the dressing mechanism at the top of the column) in respect of its vertical movements along the lead screw 149 (Z-axis) under control of hydraulic motor M2,and in respect of its infeed movements radially of the machine along the axis of lead screw 167 under the control of motor 173 (W-axis).

4. When the fresh workpiece has been properly registered at station 12, the motor M2 is actuated to drive the lead screw 149 to pass the rotating grinding wheel vertically downwards to a datum position. In this datum position there is sufficient clearance between the grinding wheel and the workpiece to permit tooth-to-tooth indexing of the latter under control of the station index mechanism 19, and to permit indexing of the workpiece station-to-station under control of the table index drive mechanism 15. The motor M2 is then actuated to drive the grinding wheel downwards through the registering intertooth gap of the workpiece in a first grinding pass. The motor M2 is then reversed to reciprocate the grinding wheel back upwards through the tooth gap, whereupon the motor 173 is actuated to advance the grinding wheel towards the axis of the workpiece in a predetermined infeed increment. The grinding wheel is again reciprocated through the tooth gap of the workpiece, and this step is repeated until the predetermined number of infeed increments have been carried out, whereupon the grinding wheel is returned to the datum position.

5. Upon completion of step 4, the station index mechanism 19 is activated to rotate the workpiece around the axis of the locator assembly 82 (C-axis) to bring the adjacent tooth gap into correct registration with the grinding wheel, whereupon step 4 is repeated. Successive grinding and workpiece indexing steps are repeated until each tooth gap has been ground at station 12, and the workpiece, having been rotated in increments through 360°, is in its initial orientation and the grinding operation is completed. Depending upon various factors, and in particular upon the number of teeth on the workpiece to be ground, it may be necessary to interrupt the grinding cycle and return the grinding wheel to its home position for wheel dressing, before the grinding cycle on all teeth has been completed.

6. Upon completion of the grinding cycle the grinding wheel is driven vertically by the motor M2 to the home position wherein it is aligned with the dressing cutters 242, whereupon the motors 202 and 219 are actuated under numerical control to cause the dressing cutters 242 to trace out the desired tooth profile in dressing the rotating grinding wheel 160. When this dressing step is completed, the grinding wheel is withdrawn from the cutters 242 and this completes the operational cycle of the machine.

The various indexing, grinding and dressing movements of the machine components are performed through a computer operated system of numerical control units. The motions to be controlled are:

1. indexing of the table assembly 2.

2. movements of the dressing cutters 242 in the horizontal plane: in the radial direction of the machine under the control of the motor 219 (X-axis), and in the tangential direction under the control of motor 202 (Y-axis).

3. vertical movements of the grinding assembly 17 on the lead screw 149 under the control of the motor M2 (Z-axis).

4. infeed movements of the grinding wheel under the control of motor 173 (W-axis).

5. angular indexing movements of the station index mechanism 19 under the control of the DC motor 110 (C-axis).

Figure 17:
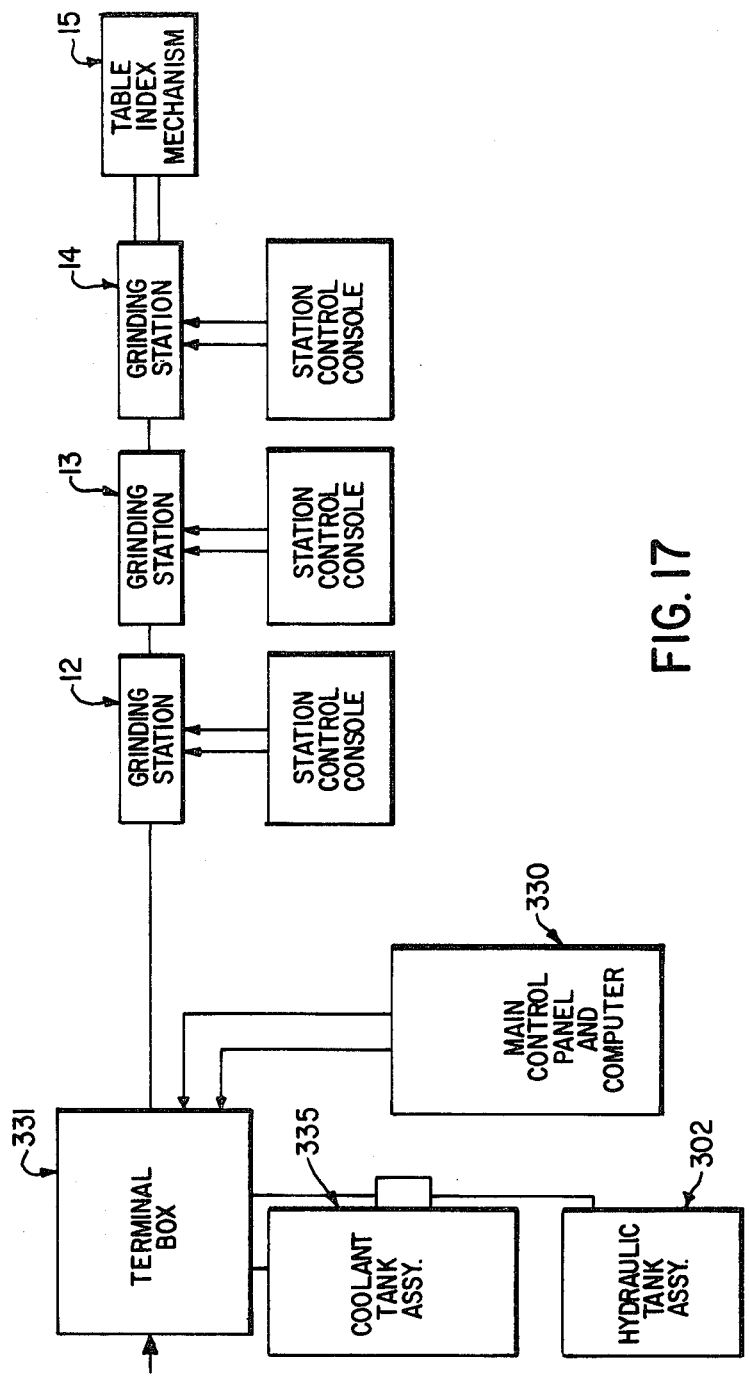
FIG. 17 is a block diagram illustrating the control system interconnection of the machine.

Referring to FIGS. 15 and 17, adjacent the operator controlled load/unload station 11 at the front of the machine is a control panel 330 which houses the main computer. The latter is connected through a terminal box 331 to individual computers 332, 333 and 334 at the grinding stations 12,13 and 14 respectively. Also coupled to the terminal box are the controls for the hydraulic tank assembly 302. The machine also includes a coolant flow system indicated in FIG. 15 at 335 for delivering coolant as required to the grinding stations 12, 13 and 14. For the sake of simplicity, no description of the coolant supply system is included since such systems are already well known in the art. The station computers 332, 333 and 334 also include individual processor and display assemblies 336 (FIG. 19) for the grinding stations 12, 13 and 14 and include a five-axis numerical control system for controlling movements of the grinding wheel and indexing movements of the workpiece at each grinding station.

The grinding station computer units 332, 333, 334 will contain the information for the performance of all functions at the individual stations. This information, particularly as regards X-axis and Y-axis movements of the dresser mechanism is put into the memory of the station unit 332, 333 and 334 by a portable computer unit (not shown) which contains an alphanumeric keyboard and a CRT (cathode ray tube) for graphical display of the information being transferred and stored. Changes to this information, as required for example when the machine is being programmed for the grinding of a different tooth profile, requires the portable unit to be plugged into the station units 332, 333 and 334 and the desired changes to be made in the program by the use of whatever language is selected.

The initial set-up of the machine will require the operator to select the information required by the main computer for its preparation of the data necessary for the station functions. This information will change with each type and size of gear. The functions that can be designated by the computer/console coordination are as follows:

1. number of teeth on gear to be ground, i.e. number of tooth index increments (C-axis),
2. tooth form to be applied to the grinding wheel by the dressing mechanism (X and Y-axes),
3. infeed increments (W-axis),
4. length of grinding stroke (Z-axis).

After the necessary grinding control data has been fed into the individual station units 332, 333 and 334, the portable computer unit is disconnected and stored. The operator will then be in a position to commence use of the machine.

The operation of the machine is as follows:

1. Upon a fresh workpiece being positioned by the operator in the load/unload station 11 and properly registered by the set up mechanism 250 and locked to the locator assembly 82, the operator actuates a pair of buttons on the main control panel 330, and assuming that the grinding operations at the grinding stations 12, 13 and 14 have been completed, the solenoid S1 is energized to operate the hydraulic actuators 99 and lock the shaft assemblies 87 by means of the disc brakes 94. Immediately thereafter, the solenoids 130 are deenergized to free the gripper assembly 115 and disengage it from the shaft 87 thus separating the two parts of the coupling.

2. Immediately thereafter, the solenoid S4 (FIG. 18) is energized to release the table brake 270 and the solenoid S2 (or S3) is energized so that hydraulic fluid is supplied to the motors M1 to index the table assembly 2. Angular movements of the table assembly 2 during indexing are monitored by the rotary encoder associated therewith, and this encoder sends signals back to the main computer initially to decelerate the table assembly, and finally to terminate motion of the table assembly when the latter has completed the indexing movement and the work holder locations 3 are in precise registration with the stations 11, 12, 13 and 14. Thereupon, the main computer de-energizes the solenoid S4 to actuate the table brake 270 under its spring loading to immobilize the table.

4. The solenoids 130 are thereupon de-energized to allow operation of the gripper assembly 115 under its spring loading to form a driving connection between the station index mechanism 19 and the workpiece, the solenoid S1 being de-energized to unlock the shaft assembly 87 for incremental rotation under the control of the station index mechanism 19.

A signal indicating actuation of the gripper mechanism 115 to establish the driving connection is fed to the station computer 336. The DC motors 202 and 219 are then energized under numerical control from the station computer to effect dressing of the grinding wheel by the dressing cutters 242 by movement in the horizontal plane along the X and Y-axes. Such movements are monitored by the linear encoders 221 and 224, and feedback signals are provided to the station computer for comparison with the tooth profile programmed therein.

6. Upon completion of wheel dressing, the station computer causes energization of the solenoids S8 and S9 causing the motor M2 to drive the grinding wheel vertically downwards: from the home position to the datum position; then in a first pass through the workpiece; and then reverses it to travel vertically back to the datum position.

7. When this first pass has been completed, the infeed DC motor 173 is signalled by the station computer to advance the grinding wheel towards the gear axis by a programmed increment as monitored by the linear encoder 174.

8. The grinding wheel is again reciprocated past the workpiece in a second grinding stroke, and this cycle is repeated until the programmed number of passes of the grinding wheel through the first tooth gap have been completed, whereupon the grinding wheel is returned to the datum position.

9. The station computer then causes release of the electromagnetic brake 112 and energization of the DC motor 110 to index the workpiece angularly by one tooth about the C-axis, this movement being monitored by the rotary encoder 114. When this indexing movement has been completed, the electromagnetic brake 112 is actuated to lock the workpiece in position, whereupon the above described grinding cycle is repeated.

10. The above sequence of operations is repeated until each tooth gap in succession has been machined by the grinding wheel, and the workpiece has been rotated (in a number of increments corresponding to the number of teeth on the gear and possibly with interruption for intermittent wheel dressing) through 360°.

11. Upon completion of the grinding cycle, the station computer energizes the solenoid S8 (S9) to cause the motor M2 to raise the grinding wheel to the dressing location. At the same time, the solenoid S1 is actuated to operate the brakes 94 and lock the shaft assemblies 87, immediately thereafter the solenoids 130 being de-energized to retract the gripper assemblies 115 thus freeing the two halves of the coupling to enable indexing of the table assembly 2.

12. Each of the grinding stations 12, 13 and 14 sends a signal to the main computer when grinding at that station has been completed, whereupon the table assembly 2 can be indexed to commence a further sequence of grinding operations.

In many cases it is required that the gear teeth be "crowned". This term applies to a method of ensuring that the load bearing surface of the gear tooth is at a designated point and not at a point dependent on the accuracy of the "lead" characteristic of the tooth. Usually the effect of crowning is to concentrate the load bearing area in the centre of the tooth face width. In this machine the desired effect of crowning can be achieved through the programme in the control system of the machine.

In other words, the infeed mechanism control (W axis) can be programmed to feed in or out as required in timed relation with the grinding wheelhead (Z axis) stroke. This will have the effect of creating a curved surface as ground by the grinding wheel. The magnitude of the curve and its position relative to the face width of the gear is determined in the programme which is put into the controller.

Similarly, the machine is readily adaptable to the grinding of helical gears. Although the foregoing description of the machine operation is confined to the grinding of spur gears (i.e. gears in which the teeth are straight or crowned and extend parallel to the gear axis), those skilled in the art will appreciate that with a relatively simple modification the machine can readily be adapted for grinding of helical gears. Briefly, an index plate (not shown) is interposed between the grinding wheel driving head 161 and its mounting plate 162 so that the axis of the grinding wheel 160 (which for spur gears is at right angles to the workpiece axis, i.e. horizontal) can be inclined at any desired angle to the horizontal corresponding to the lead angle of the helix of the gear form to be ground. The control programme for the station index mechanism is likewise modified to provide a predetermined incremental rotation of the workpiece W in phase with the grinding stroke movements (Z-axis) so that the path of contact between the grinding wheel and the workpiece will follow the desired helix for the gear form being ground.

What I claim as my invention is:

1. A multi-station grinding machine comprising
a machine bed;
a worktable mounted on said machine bed to rotate thereon about a principal axis, said worktable comprising a plurality of workpiece holding means mounted thereon at equal angular intervals around said axis and uniformly spaced therefrom, each holding means defining parallel to said principal axis a support axis for a workpiece to be held therein;
a loading/unloading station and a plurality of work stations positioned around said bed, said stations being distributed about said principal axis at angular spacings corresponding to the angular intervals between said holding means, and each work station including machining means operative to effect material removal from a workpiece;
table index means operative between said table and said bed to effect angular indexing of said table about said principal axis through a series of registered positions in each of which one holding means has its support axis in precise register with said loading/unloading station and others of said holding means have their support axes in precise register with respective ones of said work stations, indexing of said table being effective to bring a workpiece successively into register with each of said work stations;
brake means selectively operable to lock said table when in a registered position and to release said table for rotation between registered positions;
individual workpiece index means positioned in said machine bed at each said work station in a fixed location radially of said principal axis and in axial alignment with a said holding means when the table is in a registered position, each said workpiece index means being independently operable to drive the associated holding means and effect predetermined incremental indexing rotation of a workpiece held therein to present preselected portions of the workpiece for engagement by the associated machining means; and
coupling means for forming a rigid rotary drive connection between each indexing means and the associated axially aligned holding means in the registered position of the table, said coupling means being selectively disengageable to permit rotation of the table between registered positions.

2. A grinding machine according to claim 1 wherein said table index means comprise a support shaft mounted in precision bearings in said machine bed and supported on said principal axis, a ring gear carried on said shaft and a pair of worm gears mounted in said machine bed and meshing with said ring gear on opposite sides of said shaft, motor means operative to drive said worm gears in the same direction but at different torques thus to effect rotation of said table without backlash in the drive between said worm gears and said ring gear.

3. A grinding machine according to claim 2, including a rotary encoder associated with a peripheral region of said table and adapted to measure accurately angular movements of said table, control means arranged to receive signals from said rotary encoder and regulate operation of said motor means to terminate movement of the table each time it reaches one of said registered positions.

4. A grinding machine according to claim 3 wherein said control means is adapted to energize said brake means to a released condition to permit rotation of said table when said motor means are in a driving mode, and is adapted to de-energize said brake means to an engaged condition when the table reaches a registered position.

5. A grinding machine according to claim 1 wherein each said holding means has associated therewith a mechanical brake that is adapted to be engaged to prevent rotation of the holding means about said support axis at all times when said coupling means is disengaged.

6. A grinding machine according to claim 1 wherein each said workpiece index means comprises an index motor mounted in the machine bed and having a vertically arranged output shaft, said output shaft carrying said coupling means, and a rotary encoder adapted to generate signals which correspond precisely to rotary movements of said output shaft, an electromagnetic brake operative to engage said output shaft and prevent rotation thereof, and control means adapted to receive signals from said rotary encoder and actuate said electromagnetic brake after a predetermined incremental angular rotation of said output shaft has been completed.

7. A grinding machine according to any one of claims 1 to 6, wherein said coupling means comprises a pair of opposed jaws movably mounted in said index means to move radially with respect thereto, each said holding means having an axial extension formed with a pair of opposed engagement surfaces which align with said jaws of a coupling means when the table is in a registered position and means selectively operable to effect movement of said jaws into gripping engagement with said engagement surfaces to establish said rigid rotary driving connection.

8. A grinding machine according to claim 6 wherein said coupling means comprises a guide block on said output shaft and extending radially thereof, a pair of opposed jaws slidably carried in said guide block on opposite sides of the axis of the output shaft, each jaw being attached to a toggle linkage mechanism having a first pivoted link connected to a solenoid actuator, spring means associated with each said mechanism being effective to urge the jaw radially inwards to a gripping position, said solenoid when energized being effective to overcome said spring means and retract the jaw; each said holding means having an axially extending stub shaft at its lower end formed with a pair of opposed parallel engagement surfaces, said control means being effective to energize said solenoids to maintain said jaws retracted during indexing movements of said table, and to maintain said solenoids de-energized when the table is in a registered position to permit said jaws to grip said engagement surfaces and maintain said rigid rotary drive connection.

9. A grinding machine according to claim 8 wherein said toggle linkage mechanism includes second and third pivoted links pivotedly interconnected on a first axis and also pivotally connected to the first link on said first axis, said second link being pivotally connected to said jaw on a second axis parallel to said first axis, and said third link being pivoted on a third axis which is fixed in said guide block, said solenoid actuator being operative to move said first link longitudinally in one direction so that the toggle mechanism effects retraction of said second axis and the associated jaw towards said third axis, said spring means being effective to urge said first link in the opposite longitudinal direction such that said linkage mechanism tends to move said second axis and the associated jaw away from the third axis and towards the axis of said output shaft.

10. A grinding machine according to claim 9 wherein when said jaw is in engagement with said stub shaft, said second and third links extend at an angle to each other of somewhat less than 180° such that any play which may develop in the linkage mechanism in use is automatically taken up by said spring means.

11. A grinding machine according to claim 1 wherein said machining means at each work station comprises a grinding wheel carried in a wheelhead to rotate on a horizontal axis which extends tangentially with respect to said principal axis, said wheelhead being supported on a mounting plate which is guided for movement radially of said principal axis along an infeed axis on a carriage, said carriage being guided in a column for vertical movement along a grinding stroke axis which is parallel to said principal axis, individual grinding stroke drive means and infeed drive means being provided for effecting movement of said carriage along said grinding stroke axis and movement of said mounting plate and wheelhead along said infeed axis respectively.

12. A grinding machine according to claim 11 wherein said mounting plate is carried on a pair of spaced horizontal guides which extend through linear bearings in said carriage, said guides carrying a drive motor which is adapted to rotate a lead screw which cooperates with a captive nut in said carriage, rotation of said lead screw effecting movement of said mounting plate along said infeed axis, said mounting plate having associated therewith a linear encoder which is adapted to generate signals representative of such movement.

13. A grinding machine according to claim 12 wherein said carriage is guided for vertical movement on said column in guideways, said column incorporating a drive means coupled to a vertically arranged lead screw which cooperates with a captive nut on said carriage such that rotation of said lead screw effects vertical movement of said carriage along said grinding stroke axis, and further including a second, vertically arranged linear encoder adapted to generate signals corresponding to such vertical movement.

14. A grinding machine according to any one of claims 11, 12 or 13 including means interposed between said mounting plate and said wheelhead to permit adjustment of the latter about a horizontal axis radial to said principal axis such that the rotational axis of the grinding wheel can be set at a preselected angle to the horizontal.

15. A grinding machine according to claim 12 including a dressing mechanism mounted on said column, said dressing mechanism being adapted to support a pair of diamond dressing cutters, and including means for effecting movement of said cutters in unison along a pair of horizontal axes arranged at right angles to each other such that said diamond dressing cutters can be moved into engagement with said grinding wheel to machine thereon any desired profile.

16. A grinding machine according to claim 15 wherein said dressing mechanism includes first and second carriages each guided for movement along a corresponding one of said pair of horizontal axes, each said first and second carriage having an independently controllable drive system for effecting such movement, and having an associated linear encoder adapted to generate signals corresponding to such movement, said dressing mechanism further including a numerical control system adapted to receive said signals and to control actuation of said drive systems to effect dressing of the grinding wheel to a predetermined profile.

17. A grinding machine according to claim 16 wherein said numerical control means is also adapted to effect programmed control of vertical grinding stroke movements and horizontal infeed movements of said grinding wheel.

18. A grinding machine according to claim 11 including numerical control means operative to control actuation of said infeed drive means and of said grinding stroke drive means; a first linear encoder associated with said infeed drive means being operative to supply to said numerical control means feedback signals indicative of infeed movements of the grinding wheel; a second linear encoder associated with said grinding stroke drive means being operative to supply to said numerical control means feedback signals indicative of grinding stroke movements of said grinding wheel; said numerical control means being programmable to effect coordinated simultaneous movement of said infeed drive means and said grinding stroke drive means to generate a crowned tooth gear profile through said grinding wheel.

19. A grinding machine according to claim 1 wherein each said workpiece index means comprises an index motor mounted in said machine bed and having a vertically arranged output shaft, a rotary encoder associated with said workpiece index means and operative to generate signals indicative of rotational movement thereof;
said machining means comprising a grinding wheel driven to rotate on a rotational axis in a plane parallel to said principal axis;
infeed drive means adapted to effect movement of said grinding wheel along an infeed axis which is horizontal and extends radially of said principal axis;
grinding stroke drive means adapted to effect movement of said grinding wheel along a grinding stroke axis that is parallel to said principal axis;
linear encoders associated with each of said infeed drive means and said grinding stroke drive means and operative to generate signals indicative of movement of the grinding wheel along said infeed and grinding stroke axes respectively, under the influence of the associated drive means; and
numerical control means coupled to control operation of said index motor, said infeed drive means and said grinding stroke drive means, and coupled to receive the signals generated by said rotary and linear encoders.

20. A grinding machine according to claim 19 wherein said grinding wheel is adjustably mounted so that its rotational axis can be set at a predetermined angle to the horizontal.

21. A grinding machine according to claim 20 wherein said numerical control means is programmable to effect simultaneous actuation of said index motor and said grinding stroke drive means in co-ordination such that said grinding wheel generates a helical tooth form.

22. A grinding machine according to claim 21 wherein said control means is programmable to effect successive traverses of the grinding wheel through the workpiece with incremental infeed movements to grind a desired tooth gap profile in a first grinding cycle, followed by repeated index rotation of the workpiece to present each subsequent tooth gap for grinding in a subsequent grinding cycle, the workpiece being indexed in succession until every tooth gap in succession has been subjected to a grinding cycle.

23. A grinding machine according to claim 22 wherein each said index motor has associated therewith a brake means coupled to said control means to be actuated thereby to prevent rotation of said index means except when said coupling means is engaged and said index motor is being driven by said control means.

24. A multi-station grinding machine comprising
   a machine bed;
   a worktable mounted on said machine bed to rotate thereon about a principal axis, said worktable comprising a plurality of workpiece holding means mounted thereon at equal angular intervals around said axis and uniformly spaced therefrom, each holding means defining parallel to said principal axis a support axis for a workpiece to be held therein;
   a loading/unloading station and a plurality of work stations positioned around said bed, said stations being distributed about said principal axis at angular spacings corresponding to the angular intervals between said holding means, and each work station including precision grinding means operative to effect material removal from a workpiece;
   table index means operative between said table and said bed to effect angular indexing of said table about said principal axis through a series of registered positions in each of which one holding means has its support axis in precise register with said loading/unloading station and others of said holding means have their support axes in precise register with respective ones of said work stations, indexing of said table being effective to bring a workpiece successively into register with each of said work stations; said table index means comprising a power drive means coupled to said table and operative to effect rotary drive thereof, and a rotary encoder associated with a peripheral region of said table and adapted to generate signals providing a precise measurement of angular movements of said table, control means connected to receive said signals and operative to regulate said power drive means to terminate angular movement of said table each time it reaches one of said registered positions;
   brake means selectively operable to lock said table when in a registered position and to release said table for rotation between registered positions;
   workpiece index means at each said work station engageable with a said holding means when the table is in a registered position to drive that holding means and effect predetermined incremental indexing rotation of a workpiece held therein to present preselected portions of the workpiece for engagement by the associated machining means; and
   coupling means for forming a rigid rotary drive connection between each indexing means and a holding means, said coupling means being engageable when the table is in a registered position and being selectively disengageable to permit rotation of the table between registered positions.

* * * * *